United States Patent
Last et al.

(10) Patent No.: US 11,820,321 B2
(45) Date of Patent: Nov. 21, 2023

(54) GAS GENERATOR, MODULE, VEHICLE SAFETY SYSTEM

(71) Applicant: ZF Airbag Germany GmbH, Friedrichshafen (DE)

(72) Inventors: Detlef Last, Mühldorf (DE); Manfred Ramp, Waldkraiburg (DE); Rolf Ruckdeschel, Heldenstein (DE)

(73) Assignee: ZF Airbag Germany GmbH, Friedrichshafen (DE)

( * ) Notice: Subject to any disclaimer, the term of this patent is extended or adjusted under 35 U.S.C. 154(b) by 0 days.

(21) Appl. No.: 17/422,333

(22) PCT Filed: Oct. 24, 2019

(86) PCT No.: PCT/EP2019/079031
§ 371 (c)(1),
(2) Date: Jul. 12, 2021

(87) PCT Pub. No.: WO2020/143939
PCT Pub. Date: Jul. 16, 2020

(65) Prior Publication Data
US 2022/0105894 A1    Apr. 7, 2022

(30) Foreign Application Priority Data
Jan. 11, 2019  (DE) ............ 10 2019 100 623.6

(51) Int. Cl.
*B60R 21/264* (2006.01)
*B60R 21/272* (2006.01)
*F42B 3/04* (2006.01)

(52) U.S. Cl.
CPC .......... *B60R 21/264* (2013.01); *B60R 21/272* (2013.01); *F42B 3/045* (2013.01); *B60R 2021/2642* (2013.01)

(58) Field of Classification Search
CPC ........................... B60R 21/264; B60R 21/272
See application file for complete search history.

(56) References Cited

U.S. PATENT DOCUMENTS

| | | |
|---|---|---|
| 5,230,532 A | 7/1993 | Blumenthal et al. |
| 5,649,720 A | 7/1997 | Rink et al. |
| 5,725,243 A | 3/1998 | Skanberg |
| (Continued) | | |

FOREIGN PATENT DOCUMENTS

| | | |
|---|---|---|
| DE | 4242793 A1 | 7/1993 |
| DE | 10146074 A1 | 6/2002 |
| (Continued) | | |

OTHER PUBLICATIONS

Machine translation of DE 102016122192 A1. Retrieved Sep. 21, 2022. (Year: 2022).*

(Continued)

*Primary Examiner* — Barry Gooden, Jr.
(74) *Attorney, Agent, or Firm* — Kristin L. Murphy

(57) ABSTRACT

A gas generator, such as for a safety device in vehicles, comprises a pressure chamber which is filled with compressed gas and which is closed off from an environment outside of the gas generator by a membrane. The compressed gas contains a gaseous oxidant which is composed predominantly of oxygen. The pressure chamber receives a solid fuel, wherein the compressed gas is in direct contact with the fuel before the gas generator is activated. When the gas generator is activated, an igniter separated pressure-tightly from the pressure chamber triggers a conversion of the gaseous oxidant with the solid fuel, with heat being generated. The fuel is in the form of a gas-permeable fuel body made up of one or more fibers, and the molar fraction of the gaseous oxidant in the compressed gas is at least 1.1 times the amount of oxidant required for a stoichiometric (Continued)

conversion of the gas-permeable fuel body. A module and a vehicle safety system comprise such a gas generator.

20 Claims, 23 Drawing Sheets

(56) References Cited

U.S. PATENT DOCUMENTS

| | | | |
|---|---|---|---|
| 6,170,867 | B1 | 1/2001 | Rink et al. |
| 6,334,917 | B1 | 1/2002 | Hamilton et al. |
| 9,446,349 | B2 * | 9/2016 | Yeom ................. B01D 53/0407 |
| 10,207,671 | B2 * | 2/2019 | Last ......................... C06D 5/10 |
| 2018/0141514 | A1 * | 5/2018 | Last ......................... C06D 5/10 |
| 2023/0022931 | A1 * | 1/2023 | Asenkerschbaumer ..................... B60R 21/272 |

FOREIGN PATENT DOCUMENTS

| | | |
|---|---|---|
| DE | 69707629 T2 | 8/2002 |
| DE | 10208956 A1 | 9/2003 |
| DE | 102016122192 A1 | 5/2018 |
| JP | H0958395 A | 3/1997 |
| JP | H0958399 A | 3/1997 |
| JP | 2007308352 A | 11/2007 |
| WO | 0048967 A1 | 8/2000 |
| WO | 2018091327 A1 | 5/2018 |

OTHER PUBLICATIONS

International Search Report and Written Opinion for PCT/EP2019/079031 dated Feb. 11, 2020 (10 pages; with English translation).

* cited by examiner

GAS GENERATOR, MODULE, VEHICLE SAFETY SYSTEM

CROSS-REFERENCE TO RELATED APPLICATIONS

This application is a national stage of International Application No. PCT/EP2019/079031, filed Oct. 24, 2019, the disclosure of which is incorporated herein by reference in its entirety, and which claimed priority to German Patent Application No. 102019100623.6, filed Jan. 11, 2019, the disclosure of which is incorporated herein by reference in its entirety.

TECHNICAL FIELD

The disclosure relates to a gas generator, in particular for a safety device in vehicles, and to a module comprising a gas generator and a vehicle safety system.

BACKGROUND

Gas generators provide gas for filling an airbag or for driving a belt tensioner, for example. In known hybrid gas generators, the majority of the gas is generated from pressurized gas stored in a housing of the gas generator. The housing is opened by a pyrotechnical igniter igniting a pyrotechnical propellant that heats the gas and destroys a membrane closing off the housing to the outside so that the gas can flow out.

Such hybrid gas generator is described in DE 10 2011 009 309 A1. A combustion chamber containing a pyrotechnical solid propellant is in fluid communication with a pressure chamber separated from the combustion chamber and filled with compressed gas. The pressure chamber is filled, for example, with argon, helium or a gas mixture at a pressure of up to 500 bars. In this gas generator, the compressed gas surrounds also a pyrotechnical solid propellant. Thus, a component closing off the pressure chamber from the combustion chamber is only slightly mechanically loaded.

The pyrotechnical solid propellants are balanced mixtures of solid organic and inorganic fuels and oxidants usually containing nitrogen and carbon. The solid propellants must be brought into a suitable shape such as pellets, extrudates and granules of most various geometries for controlling the combustion characteristic. This results in complicated production and logistics of pyrotechnical solid propellants, wherein strict safety regulations must be observed for handling and storage of the propellants.

In a so-called "bonfire" or "slow heat" test, which is to simulate, for example, a non-functional triggering of a gas generator in case of vehicle fire, a gas generator is triggered by external overheating and, consequently, is thermally activated or ignited. At an increased temperature, pyrotechnical solid propellants tend to an increased conversion rate, however. Therefore, the gas generator housings must have a sufficiently solid design. Optionally, the use of additional ignition advance devices is required to restrict triggering temperatures to a technically controllable measure. However, at low temperatures of e.g. −40° C., the pyrotechnical solid propellants have a lower conversion rate.

In other gas generators, a reaction of gaseous or liquid fuels such as hydrogen or liquid gas with equally gaseous oxidants such as oxygen is employed for energy generation. Those gas generators require either two pressure tanks separated from each other with a complex opening and ignition control or a sufficiently dimensioned gas tank for a combustible gas mixture. In all cases, gas is generated by a reaction of the pyrotechnical solid propellant or the gaseous and/or liquid fuels.

WO 99/032334A describes a gas generator having a first chamber into which a fuel is introduced, and an igniter for activating a reaction of the fuel to form gaseous combustion products. The fuel is provided in the solid state and is an open-cell foam. The oxidant used is nitrogen oxide that is in contact with the solid fuel. The pressure inside the first chamber may range from 4.1 to 10.3 MPa.

From U.S. Pat. No. 6,238,500 A1, a gas generator is known comprising a pressure tank with gas-generating material stored under pressure and an igniter for activating the gas-generating material. The gas-generating material comprises an oxidant and a fuel, wherein the oxidant is predominantly composed of nitrous oxide in a liquid-gas state. The major portion of the fuel is polyvinyl alcohol in solid porous form, wherein a portion of the nitrous oxide is absorbed into the pores of the polyvinyl alcohol. Upon combustion of the gas-generating material, combustion products substantially composed of carbon dioxide, nitrogen and water are formed. Along with the gas-generating material, a mixture of one or more reactive gases and/or inert gases can be stored in the pressure tank. Examples of reactive gases are oxygen, butane or hydrogen. According to one embodiment, the pressure inside the pressure tank is about 13.8 MPa.

When using nitrous oxide as a main oxidant, the combustion behavior of the gas generators is difficult to control or to reproduce particularly at low temperatures, as the nitrous oxide can condense out and, thus, is not fully available for the conversion with the solid fuel. Moreover, due to the low pressure prevailing in the pressure chamber, more solid fuel must be used to provide the amount of gas required to activate the safety device.

DE 10 2016 122 192 A1 illustrates a gas generator having a pressure chamber filled with compressed gas, the compressed gas containing a gaseous oxidant that is mainly composed of oxygen. In the pressure chamber, an open-cell porous and solid fuel is included which is in direct contact with the compressed gas. The porous fuels mentioned are foam bodies of various geometry, and may be made from plastic.

However, several industrially available plastic foams do not have sufficiently high porosity, thus preventing the oxidant present in the compressed gas from optimally penetrating and burning the fuel. Some of the especially advantageously burning materials moreover are not available as foam at all or are merely available as closed-pore foam.

Thus, there is a need to further develop a gas generator that can reliably generate gas and can be manufactured at low cost. Further, a cost-efficient module and a vehicle safety system that includes a gas generator is also needed.

SUMMARY

A gas generator is disclosed herein. Similarly, a module that utilizes a gas generator is also disclosed. Further, a vehicle safety system is also disclosed.

In one exemplary arrangement, a gas generator is disclosed that comprises a pressure chamber which is filled with compressed gas and which closes off the gas generator by a membrane from an outside environment. The compressed gas contains a gaseous oxidant which is composed predominantly of oxygen. The pressure chamber receives a solid fuel, wherein the compressed gas is in direct contact with the fuel, before the gas generator is activated.

Upon activation of the gas generator, an igniter separated pressure-tightly from the pressure chamber triggers a conversion of the gaseous oxidant with the solid fuel, with heat being generated. Upon activation of the gas generator, a conversion of the gaseous oxidant with the solid fuel can be triggered by the igniter, with heat being formed.

According to one exemplary arrangement, the solid fuel is in the form of a gas-permeable fuel body made up of one or more fibers. Accordingly, it has surprisingly turned out that fuel bodies made from one or more fibers have a sufficiently large surface and a combustion characteristic that is superior especially to plastic foams.

The molar fraction of the gaseous oxidant in the compressed gas is at least 1.1 times the amount of oxidant required for a stoichiometric conversion of the gas-permeable fuel body.

In the disclosed gas generator, the gaseous oxidant is in direct contact with the gas-permeable fuel body made up of one or more fibers. The fuel is provided from the start in a finely spread form of a defined arrangement inside the pressure chamber, for example in the form of a fabric, a wadding or any other textile material. Clearances or pores of the fuel bodies therefore can properly mix with the compressed gas containing the gaseous oxidant, such that the fuel is always in direct vicinity to the oxidant. Thus, in the case of activation, by triggering the igniter, a very rapid conversion of the fuel with the oxidant is obtained. In one exemplary arrangement, the gas generator helps achieve a very short combustion time of <0.1 second.

The pressure-tight delimitation of the igniter against the pressure chamber filled with compressed gas and the fuel body enables cost-efficient components to be used for the igniter and the fastening thereof, optionally in an igniter chamber. The energy released by the igniter must merely be sufficient to open an igniter membrane delimiting the igniter chamber and to activate the conversion of the fuel with the gaseous oxidant.

Due to the high energy density of the fuel present in solid form as a gas-permeable fuel body and made up of one or more fibers, fuel bodies of low density and therefore also low weight can be used. The gaseous oxidant provided in stoichiometric surplus ensures the fuel body to completely burn after activation of the igniter.

The highly pressurized compressed gas in turn provides the major portion of the amount of gas required for activating the safety device. The combustion characteristic and, thus, the gas generator output can be further controlled via the shaping and dimensioning of the solid fuel body.

Moreover, the gas-permeable fuel body can be easily positioned inside the pressure chamber and relative to the igniter. For example, it is possible to clamp the fuel body between two points inside the pressure chamber or to bond the fuel body to an inner wall of the pressure chamber.

Fibers suited for manufacturing the fuel body are manufactured on a large industrial scale, are available all over the world and therefore are extremely cost-efficient. In addition, the fibers can be further processed in a plurality of different three-dimensional structures to set a combustion characteristic. When selecting suitable materials for the gas-permeable fuel body, moreover a complete low-emission combustion can be achieved while forming exclusively gaseous combustion products without any dust residues.

The igniter triggered in the case of activation opens the pressure-tight delimitation between the igniter and the pressure chamber and, at the same time, heats the fuel body and the oxidant to a temperature which is sufficient to start conversion of the fuel with the gaseous oxidant. Reaction heat released by the conversion of the fuel with the oxidant further heats the compressed gas. The excess pressure thus forming in the pressure chamber or a shock-wave generated after activation of the igniter opens a membrane separating the pressure chamber from the environment outside of the gas generator. The heated compressed gas flows out and actuates a safety device, such as an airbag, a belt tensioner or a pedestrian impact protection arrangement.

The conversion of the solid fuel with the gaseous oxidant in the gas generator can be controlled, for example, by the pore size in the fuel body, the thickness of the one or more fibers, the chemical composition of the fuel and the fraction of oxygen in the compressed gas. Since oxygen is present in gaseous form in all pressure conditions prevailing in the gas generator, proper oxidant penetration of the gas-permeable fuel body made up of one or more fibers is guaranteed. Conversely, the fuel is provided to be extremely finely spread in the compressed gas. The use of the gaseous oxidant in stoichiometric surplus moreover safeguards rapid and complete conversion of the solid fuel.

The reaction heat forming during conversion of the fuel can be used to heat the compressed gas. For example, the conversion of a typical gas-permeable fuel body made up of one or more fibers with oxygen supplies reaction heat that is at least about 8 times the reaction heat of the conversion of a typical pyrotechnical solid propellant. Thus, the reaction gases forming during conversion of the gas-permeable fuel body with oxygen have to contribute to the amount of gas required to activate the safety device to a small extent only.

In the case of "bonfire" or "slow heat", the pressure chamber opens by the forming excess pressure. In this way, the major portion of the oxidant is removed from the system and the fuel can disintegrate only slowly. Accelerated combustion with deflagration of the fuel is not to be expected, as this reaction, at the most, generates a small amount of gas and the oxidant required for the conversion is largely missing.

In accordance with a first exemplary arrangement of the gas generator according to the disclosure, the compressed gas may be made up of at least one inert gas and the at least one gaseous oxidant. The inert gas may be selected from the group including helium, argon and nitrogen as well as the mixtures thereof.

In accordance with one exemplary arrangement of the disclosure, the gaseous oxidant is predominantly composed of oxygen and optionally further gaseous oxidants. "Gaseous" means that the oxidant is provided in the gaseous state in standard conditions (273.15 K and 1.0 bar). "Predominantly" in accordance with one exemplary arrangement of the disclosure means a molar percentage of more than 50%. However, "predominantly" may also include a molar percentage of at least 60%, at least 70%, at least 80% or at least 90% of oxygen (O2) of the gaseous oxidant.

In one exemplary arrangement, the gaseous oxidant includes oxygen.

Optionally, another oxidant could also comprise nitrous oxide. The use of oxygen as gaseous oxidant offers the advantage of being readily available and of safely penetrating the gas-permeable fuel body present in the pressure chamber. Thus, rapid conversion of the solid fuel with the gaseous oxidant is ensured, when the gas generator is activated.

In one exemplary arrangement, the fraction of the gaseous oxidant in the compressed gas amounts to a minimum of about 200% and a maximum of about 1000% of the amount required for a stoichiometric conversion of the fuel with the gaseous oxidant. The use of a sufficient surplus of gaseous oxidant can guarantee a complete conversion of the solid fuel with the gaseous oxidant and, thus, release of the maximum amount of heat for heating the remaining compressed gas.

In one exemplary arrangement, the at least one gaseous oxidant may be provided in a fraction of from 10 to 40 vol-% in the compressed gas. In another exemplary arrangement, the at least one gaseous oxidant may be provided in a fraction of from 10 to 30 vol-% of the compressed gas. In yet another exemplary arrangement, the at least one gaseous oxidant may be provided in a fraction of from 15 to 30 vol-% of the compressed gas.

The average molar mass of the compressed gas ranges from 7 to 39 g/mol. The average molar mass corresponds to the average value of the molar masses of the individual components of the compressed gas, weighted with the respective proportions of substance.

In one exemplary arrangement, the compressed gas is a mixture of argon, helium and oxygen.

In accordance with another exemplary arrangement, the compressed gas in the closed pressure chamber is pressurized at least at a pressure of 350 bars. In one exemplary arrangement, the compressed gas is pressurized within the range of 350 to 700 bars. This pressurization ensures the amount of compressed gas to be sufficient already per se to activate the safety device connected to the gas generator, such as to completely inflate an airbag. The conversion of the solid fuel with the gaseous oxidant need not provide any additional gas, but only has to release an amount of heat required to heat the compressed gas so that a sufficient inflation pressure can be maintained. However, it is not detrimental, and is even desired in many cases, when the conversion of the gas-permeable fuel body with the gaseous oxidant takes place substantially free of residues and gaseous conversion products are formed.

The gas-permeable fuel body acting as fuel and being made up of one or more fibers can be composed, by a plurality of different technologies, of endless fibers—also referred to as monofil—or of threads made up of plural fibers.

According to an exemplary arrangement, the fuel body is made up of textile material in which one or more fibers are contained. The textile material may be selected from the group that includes a fabric, knitted fabric, non-woven, bonded fabric, felt or wadding and combinations thereof. In this way, for each fiber material the best-suited structure of the textile fuel body can be selected and adapted to a desired combustion characteristic. In general, the two- and three-dimensional textile structures have a large surface so that rapid conversion with the oxidant is ensured.

The individual fibers may have different structures and may be provided, e.g., as multi-component, stacking, round or hollow fiber and as monofilament. The fibers themselves can be microporous in order to further increase the surface. In general, the fibers or threads of the starting material used have a defined material thickness ranging from 0.01 to 1 mm.

The fibers used can be natural fibers, in particular natural plant fibers and in some exemplary arrangements, fibers which are obtained from cellulose or starch, wherein they may also be chemically re-treated. Those fibers comprise especially cellulose ether, cellulose ester, cellulose acetate, cellulose acetate butyrate, cellulose propionate, nitrocellulose, phenols, polysaccharides and polyacetals. Basically, also animal natural fibers such as wool fibers are suitable.

Further, even synthetic fibers of spinnable synthetic materials, for example of polyolefins such as polypropylene, polyethylene, polybutadiene and/or polystyrene, as well as polyamides, vinyl polymers, especially polyvinyl acetate, polyurethane, polyether, polyester, especially polyethylene terephthalate, polytrimethylene terephthalate and polybutylene terephthalate, polyimides, polyamide imide, aramids, polyacrylates, polyacrylic nitrile, polybenzimidazole, polyurea, melamine resins, polyvinyl alcohol and/or polymethacrylate can be used as fiber material.

Moreover, the fibers can also be obtained from waxes or oxygen-containing substances, such as from pyrrole, naphthalin, and from nitrate salts of amines, nitramines and nitro compounds.

In one exemplary arrangement, in the fuel body, also different fibers can be present side by side and/or connected to each other to form a three-dimensional structure.

Advantageously, the fibers can be spun to form threads and/or can be twisted to form yarns and/or twists. Therefrom more stable textile fiber materials are resulting for further processing. The individual threads, yarns and/or twists then can be used to form textile fabrics and/or three-dimensional fiber bodies.

The gas-permeable textile fuel body can be in the form of a cylindrical body, a lap, a coil or a strip band and can optionally be provided with spacers. In general, the textile fabrics and/or three-dimensional fiber bodies can be further processed, such as by rolling, entangling, plugging, cutting and/or stamping. Also, plural fiber bodies can be stacked onto and/or fastened to one another.

The geometrical shape of the gas-permeable fuel body is preferably adapted to the shape of the portion of the pressure chamber receiving the fuel body. The gas-permeable fuel body can be inserted in one piece, i.e. as a monolith, into the pressure chamber so that the entire fuel is provided in one single fuel body. As an alternative to this embodiment, the gas-permeable fuel body may also be provided in plural parts in the pressure chamber.

According to one exemplary arrangement, the gas-permeable fuel body comprises a carrier, and in one particular arrangement, a winch, onto which the single fiber or plural fibers are wound. The winch permits a fiber material, such as a thread, a yarn or a twist, to be easily cut to a defined length for ease of mounting as a thread lap inside the gas generator.

In one exemplary arrangement, the fiber materials may also have an additional coating and, thus, be in the form of a compound material having a matrix of combustible fiber and fillers dispersed on the latter and preferably convertible with oxygen while heat is generated.

As fillers, metals in the form of a metal foam and/or of a metallic filler can also be used, such metals being selected from aluminum, magnesium, titanium as well as alloys and mixtures thereof. Said metals are available at low cost and develop extreme reaction heat when converted with oxygen. The metals, as well as the compounds, are almost unrestrictedly storage-stable under the service conditions of a vehicle. Moreover, handling of said fuels as compared to pyrotechnical solid propellants is by far safer so that no complex and expensive safety measures have to be taken.

In one exemplary arrangement, fibers are used that are convertible with the gaseous oxidant while heat is generated, preferably those substances during combustion of which only gaseous combustion products such as carbon dioxide and water are formed and which release no particles are used in the gas-permeable fuel body.

According to one exemplary arrangement, the gas-permeable fuel body consists solely of such plastic material which results in gaseous combustion products only when being converted with the gaseous oxidant.

In one exemplary arrangement, the density of the gas-permeable fuel body ranges from 10 to 90 kg/m$^3$. In a further exemplary arrangement, the density of the gas-permeable fuel body ranges from 10 to 60 kg/m$^3$. The combustion characteristics can be controlled via the density of the gas-permeable fuel body. The denser the fuel body, the more slowly the conversion with the gaseous oxidant, especially oxygen. However, denser gas-permeable fuel bodies can also help generate larger amounts of energy. Due to the low density of the gas-permeable fuel body, combustion rates of more than 0.1 m/s, and in some instances, 3 m/s, or more can be achieved.

In one exemplary arrangement, the compressive hardness of the gas-permeable fuel body is in the range of from 2.0 to 10 kPa. The compressive hardness indicates the force required to compress a test specimen to 40% of its original height between two plates. Square test specimens having dimensions of 100×100 mm$^2$ and a height of 50 mm are used.

The gas-permeable fuel body may be pigmented or marked by color in any other way. This permits differentiation between fuel bodies having different compositions and different combustion characteristics.

For further control of the combustion characteristics, it is further possible to use a gas-permeable fuel body comprising two or more different textile fabrics and/or fiber bodies of equal or different composition, geometry and/or density. In this way, the combustion characteristics of the fuel can be further influenced. For example, it is possible to dispose one or more fiber bodies of the gas-permeable high-density fuel close to the igniter inside the pressure chamber, whereas one or more fiber bodies of the gas-permeable low-density fuel are disposed remote from the igniter. When the igniter is activated and the fiber bodies close to the igniter are converted, initially a large amount of energy is generated, while in the further course of the fuel combustion a higher combustion rate can be achieved due to the lower density of the fuel fiber bodies disposed remote from the igniter.

The gas-permeable fuel body can have a higher density, especially on the igniter side, than on the side of the pressure chamber opposite to the igniter, wherein the gas-permeable fuel body preferably has a density gradient with a density decreasing from the igniter toward the membrane. For controlling the combustion characteristics also a course of density inverse to the afore-described one may be more favorable. In such case, the gas-permeable fuel body has a lower density on the igniter side than on the side of the pressure chamber opposite to the igniter. Here the gas-permeable fuel body has a density gradient with a density increasing from the igniter toward the membrane. Instead of using different molded bodies made of the gas-permeable fuel, it is also possible to use a monolithic gas-permeable fuel body with a density gradient.

The gas-permeable fuel body can completely or partially fill the pressure chamber. In one exemplary arrangement, the gas-permeable fuel body fills at least about 3% of the volume of the pressure chamber. In a further exemplary arrangement, the gas-permeable fuel body fills 3 to 95% of the volume of the pressure chamber. In yet another exemplary arrangement, the gas-permeable fuel body fills 5 to 50% of the volume of the pressure chamber. The various exemplary arrangements having a high filling of the pressure chamber volume by the gas-permeable fuel body are especially advantageous, when upon activation of the gas generator a shockwave is generated with the aid of which the membrane separating the pressure chamber from the outside environment of the gas generator is opened very quickly. The shockwave passing through the gas-permeable fuel body can be mechanically transmitted in this case by the gas-permeable fuel body over large distances and at high speed so that a particular design of the gas generator is enabled without substantially impairing the function of the gas generator.

According to one exemplary arrangement, the gas-permeable fuel body is the only fuel in the pressure chamber. Along with the gaseous oxidant, the gas-permeable fuel body then constitutes the only propellant in the pressure chamber. Such an arrangement can be manufactured at low cost and safely handled, as the gas-permeable fuel body can be transported, stored and processed without any particular safety measures in contrast to pyrotechnical solid propellants.

According to another exemplary arrangement, the gas-permeable fuel body can be provided in the pressure chamber along with a pyrotechnical solid propellant. By adding the pyrotechnical solid propellant, on the one hand, the combustion characteristics of the gas-generating material and thus the gas generator output can be modified. Moreover, this embodiment enables the gas-permeable fuel body to be used merely in a proportion that is sufficient for the gas-permeable fuel body along with the gaseous oxidant to act as a booster charge for activating the pyrotechnical solid propellant. In addition, the gas-permeable fuel body can adopt further functions in the combustion chamber portion, such as the function of supporting the pyrotechnical solid propellant to avoid rattling noise and/or of a volume compensating means. Therefore, the disclosure allows to make use of functional elements previously provided already in conventional gas generators in addition for gas generation and/or generation of thermal energy.

In accordance with the exemplary arrangement, a pyrotechnical solid propellant is a substance or a substance mixture that contains at least one solid fuel and one solid oxidant and that reacts, upon activation, in a self-maintaining manner while heat is generated.

The pyrotechnical solid propellant may be provided in the form of granules or in the form of pellets or any other geometrical molded bodies which are integrated in the gas-permeable fuel body made up of one or more fibers. The gas-permeable fuel body thus forms a matrix in which the pyrotechnical solid propellant is received and, resp., integrated, optionally in the form of molded bodies having a defined geometry. In this exemplary arrangement, the gas-permeable fuel body and the pyrotechnical solid propellant are in especially close contact with each other. Thus, the combustion characteristics of the gas-generating mixture in the pressure chamber can be adjusted to be optimally reproducible, in particular by the proportion of the pyrotechnical solid propellant to the gas-permeable fuel body.

Those skilled in the art will find in DE 10 2016 122 192 A1 further options to configure the gas-permeable fuel body and the pyrotechnical solid propellant.

The weight ratio of gas-permeable fuel body to pyrotechnical solid propellant in the combustion chamber can be selected almost freely. Since the addition of the pyrotechnical solid propellant to the gas-permeable fuel body is optional, an exemplary percentage by weight of the gas-permeable fuel body ranges from about 0.5 to 100%. In a further exemplary arrangement, the percentage by weight of the gas-permeable fuel body ranges from 1 to 95%. In each of the above arrangements, the percentage is based on the total mass of gas-permeable fuel body and pyrotechnical solid propellant.

According to a an exemplary arrangement, the gas-permeable fuel body forms, especially along with the gaseous oxidant, a booster charge for the pyrotechnical solid propellant. In this case, the percentage by weight of the gas-permeable fuel body may be in the range from about 0.25 to 15 wt-%. In further exemplary arrangements, the percentage by weigh of the gas-permeable fuel body ranges from 0.5 to 10 wt-%. In each of the preceding examples, the percentages are based on the total mass of gas-permeable fuel body and pyrotechnical solid propellant. When the gas generator is activated, initially a quick combustion of the gas-permeable fuel body takes place, wherein the reaction energy released by said combustion activates the combustion of the pyrotechnical solid propellant. In order to improve the energy input into the pyrotechnical solid propellant, the gas-permeable fuel body in this case can contain a proportion of metal, preferably powdered metal.

Hereinafter, the structure of the gas generator according to the disclosure will be explained in detail. The embodiments described in the following can be used along with all variants of the afore-described gas-permeable fuel body composed of one or more fibers and, optionally, of the pyrotechnical solid propellant.

In accordance with one exemplary arrangement of the gas generator, the housing of the gas generator according to the disclosure delimiting the pressure chamber is a hollow cylinder. The housing may be provided with an indentation in the form of an annular groove. The annular groove can be used for fixing the gas-permeable fuel body inside the pressure chamber. The arrangement of the annular groove thus also defines the dimension of the portion within the pressure chamber in which the gas-permeable fuel body and, optionally, the pyrotechnical solid propellant are received. Thus, the arrangement of the annular groove at the housing can also be indicative of the gas generator output which is defined, inter alia, by the amount of gas-permeable fuel body introduced into the pressure chamber.

Further, the gas-permeable fuel body can be provided to be fixed inside the pressure chamber by force fit, form fit and/or by adhesive bonding to a sidewall on the inner face of the housing. Moreover, it is possible to press-fit the gas-permeable fuel body into the housing and to compress it in the radial direction, and in one exemplary arrangement, by a compression of up to 10%, so that the gas-permeable fuel body is retained inside the pressure chamber by force fit.

As another exemplary arrangement, a friction surface that holds the gas-permeable fuel body in position can be provided on the inner wall of the housing. Finally, it is also possible to introduce separate fixing elements such as spring elements into the gas-permeable fuel body, said fixing elements bearing against the inner wall of the housing and fixing the gas-permeable fuel body in the desired position.

Alternatively, the gas-permeable fuel body can be applied to a carrier such as a winch which bears against the housing and/or the igniter housing. The fuel body itself can also form a stable structure that bears against the housing and/or the igniter housing.

The gas-permeable fuel body thus can be positioned in the pressure chamber without separate partition elements being provided which would delimit a holding space for the fuel in the pressure chamber.

Advantageously, the gas-permeable fuel body may be provided to be spaced apart from the igniter inside the pressure chamber, the fuel body being arranged, in one exemplary arrangement, at a distance of up to two times, the inner diameter of the housing. In other exemplary arrangements, the fuel body is arranged at a distance of 0.5 to 1.5 the inner diameter of the housing. In yet a further exemplary arrangement, the fuel body is arranged at a distance of one times the inner diameter of the housing.

According to, at least one component is provided which partitions the pressure chamber while forming a combustion chamber adjacent to the igniter. For example, in one exemplary arrangement, the at least one component subdivides the pressure chamber into the adjacent combustion chamber and a pressure chamber portion which contains only the compressed gas, the gas-permeable fuel body and, optionally, the pyrotechnical solid propellant being received in the combustion chamber.

The partition between the remaining pressure chamber portion and the combustion chamber by the component is not pressure-tight, however, so that there can be a pressure compensation between the combustion chamber and the remaining pressure chamber portion, and the compressed gas with the gaseous oxidant continues to be in direct contact with the gas-permeable fuel body inside the combustion chamber.

In one exemplary arrangement, the component is a screen by which combustion residues from the combustion of the gas-permeable fuel body can be retained. The arrangement of a screen in the pressure chamber is advantageous when the gas-permeable fuel is used along with a pyrotechnical solid propellant. In this case, the screen may also act as filter element by which the residues from the combustion of the pyrotechnical solid propellant can be retained.

Further, the component can be in the form of a burst member having a weakened zone configured so that it can be destroyed upon activation of the gas generator. This configuration helps generate, upon activation of the gas generator, a shockwave that propagates very quickly across the pressure chamber and causes the membrane to open. Possible configurations of the component are described in detail in DE 10 2011 009 309 A1 which is hereby incorporated by reference in its entirety.

In one exemplary configuration, the component includes at least one overflow opening and/or is disposed such that pressure compensation takes place between the combustion chamber and the remaining pressure chamber portion partitioned by the component so that the compressed gas is also present in the combustion chamber.

In one exemplary arrangement, the combustion chamber occupies about 2 to 50% of the volume of the entire pressure chamber. In another exemplary arrangement, the combustion chamber occupies about 5 to 30% of the volume of the entire pressure chamber.

The combustion chamber can be completely or partially filled with the gas-permeable fuel body and, optionally, the pyrotechnical solid propellant. In one exemplary configuration, the gas-permeable fuel body and, optionally, the pyrotechnical solid propellant fills at least 50%, and in some instances, between 50 to 100%, of the volume of the combustion chamber.

In accordance with another exemplary arrangement, the gas generator is configured so that already the activation of the igniter and/or the opening of an igniter membrane separating the igniter from the pressure chamber initiates a shockwave. Also, a combination of these arrangements is possible so that the shockwave can emanate from the igniter, from the igniter membrane and/or from the bursting disk formed by the component.

In one exemplary arrangement, a heavy-duty igniter is used to initiate the shockwave. Those heavy-duty igniters are known from prior art and typically make use of a primary charge of zirconium/potassium perchlorate and a secondary charge of titanium hydride/potassium perchlorate.

According to another exemplary arrangement, in the gas generator at least two pressure chamber portions are formed which are separated from each other in a pressure-tight manner. The first pressure chamber portion is disposed close to the igniter and contains the compressed gas with the gaseous oxidant and the gas-permeable fuel body as afore described. Further, the first pressure chamber portion is closed by a membrane and is pressure-tightly closed off the second pressure chamber portion and, thus, an outside environment of the gas generator. The second pressure chamber portion adjacent to the first pressure chamber portion only contains the compressed gas and is pressure-tightly closed off the outside environment of the gas generator by a second membrane.

The compressed gas in the first and second pressure chamber portions may have the same or a different composition. Further, in the first and second pressure chamber portions equal or different gas pressures may be utilized. If the gas pressure in the first pressure chamber portion equals the gas pressure in the second pressure chamber portion, an adhesively bonded membrane may be used to partition the pressure chamber portions. Effectively, said membrane is not pressure-loaded in the idle state of the gas generator.

The subject matter of the disclosure further is a module comprising an afore-described gas generator according to the disclosure, an airbag inflatable by the gas generator according to the disclosure and a mounting device for attaching the module to a vehicle.

In addition, the subject matter of the disclosure also is a vehicle safety system, especially for the protection of a person such as a vehicle occupant or a pedestrian, comprising an afore-described gas generator according to the disclosure, an airbag inflatable by the gas generator as part of a module, and an electronic control unit by which the gas generator according to the disclosure can be activated, when a trigger situation is present.

BRIEF DESCRIPTION OF THE DRAWINGS

Further features and advantages of the present disclosure will be obvious from the following description of exemplary arrangements in connection with the drawings, wherein parts of like function are provided with like reference numerals. These arrangements are not meant to be restricting, however. The drawings show in.

DETAILED DESCRIPTION

Figure 1:
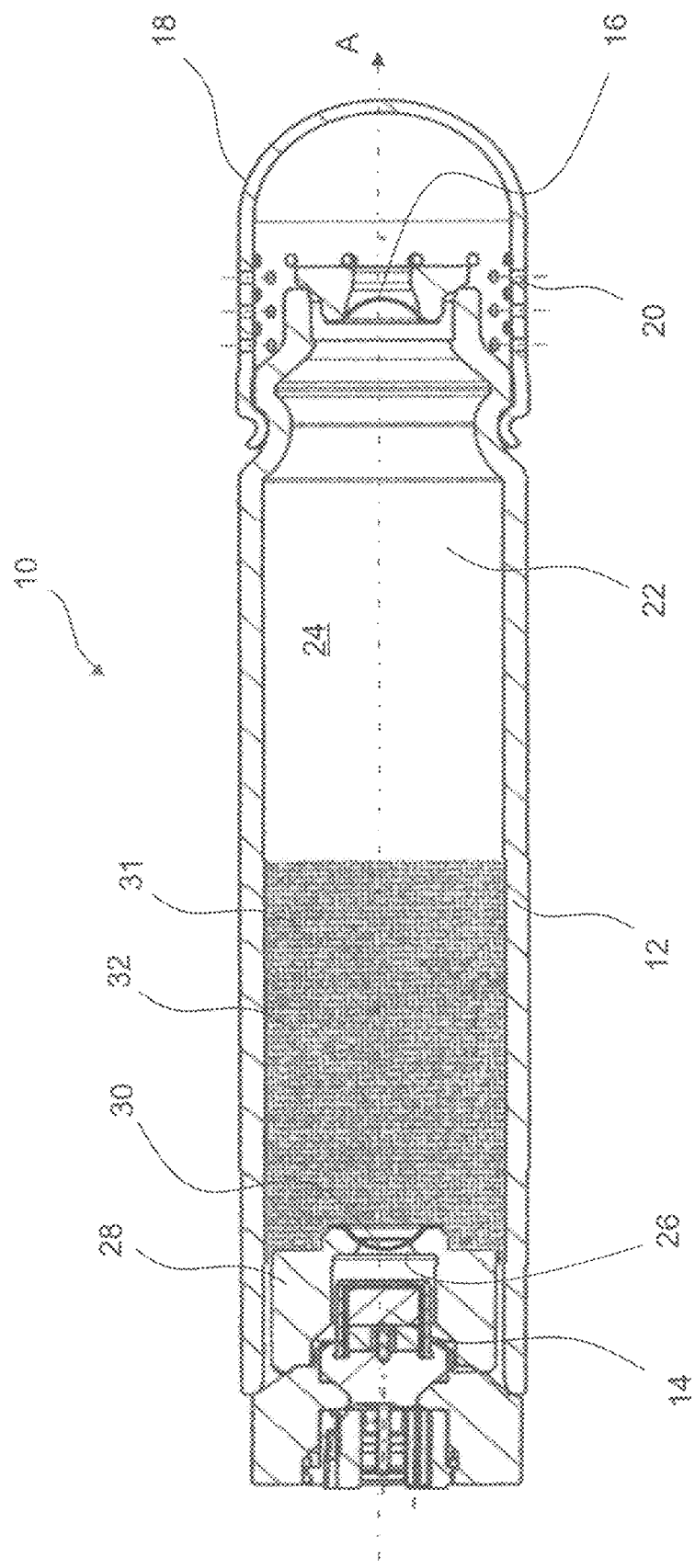
FIG. 1 a first exemplary arrangement of a gas generator according to the disclosure without any partition elements in a pressure chamber.

FIG. 1 illustrates a first embodiment of a gas generator 10 according to the disclosure. The gas generator 10 has an elongate cylindrical housing 12 at a first axial end of which an igniter of common design is provided and at a second axial end of which the housing 12 is closed off from the environment outside of the gas generator 10 by a membrane 16.

The housing 12 forms the outer housing of the gas generator 10. A diffusor 18 provided with outflow openings 20 in a known way is connected to the housing 12 in the axial direction and guides the gas flowing out of the diffusor 18 to a safety device to be activated (not shown).

The housing 12 confines a pressure chamber 22 connected to an igniter 14 in the axial direction A. The pressure chamber 22 is filled with compressed gas 24. The compressed gas 24 comprises an inert gas such as argon, helium and/or nitrogen or any other suitable gas mixture and moreover contains a gaseous oxidant. In one exemplary arrangement, the gaseous oxidant is composed predominantly (>50 mol %), or even completely, of oxygen.

The average molar mass of the compressed gas 24 ranges from 7 and 39 g/mol. The compressed gas 24 is pressurized in the closed pressure chamber 22 at least at a pressure of 350 bars. In one exemplary arrangement, the compressed gas 24 is pressurized in the closed pressure chamber 22 in a range of from 350 to 700 bars. The amount of compressed gas 24 is thus sufficient to activate the safety device connected to the gas generator 10, for example to completely inflate an airbag.

The igniter 14 is separated pressure-tightly and gas-tightly from the pressure chamber 22. For this purpose, an opening 26 in an igniter housing 28 in which the igniter 14 is accommodated is closed toward the pressure chamber 22 by an igniter membrane 30. The igniter membrane 30 may be, for example, a sheet metal disk made of carbon steel.

According to the disclosure, in the pressure chamber 22 a solid fuel 31 is received. The pressure chamber 22 has no further partition devices in the exemplary arrangement shown in FIG. 1. The solid fuel 31 is present in the pressure chamber 22 as a gas-permeable fuel body 32 made up of one or more fibers. Thus, the compressed gas 24 can completely penetrate the pores of the fuel body 32, and, before the gas generator 10 is activated, the compressed gas 24 is in direct intimate contact with the fuel 31. The molar fraction of the gaseous oxidant in the compressed gas 24 is at least 1.1 times the amount of oxidant required for a stoichiometric conversion of the fuel 31. Hence, in the case of activation, rapid and complete conversion of the solid fuel body 32 is ensured. In one exemplary arrangement, the stoichiometric surplus of the oxidant across the fuel 31 is 2 to 10 times the amount required for conversion of the gas-permeable fuel body 32.

The gas-permeable fuel body 32 in the shown exemplary arrangement is a three-dimensional body composed of one or more fibers and made of textile material. The gas-permeable fuel body 32 can be formed, for example, of a fabric. In particular, the gas-permeable fuel body 32 can be a reeled fabric or a stack of plural fabric layers which may optionally be provided with spacers.

The fabric can be obtained by weaves of monofilaments, threads, yarns or twists known to those skilled in the art, for example by a plain weave, body weave, satin weave or Panama weave as well as weave patterns derived therefrom.

Alternatively, the gas-permeable fuel body 32 may be made up of any other textile material, for example as knitwear, such as knitted fabric, knit, or in the form of a wadding, a laid fiber fabric or a non-woven.

In the exemplary arrangement shown in FIG. 1, the gas-permeable fuel body 32 composed of fibers is made up of plural fibers which may also have been further processed into yarns or twists, for example. Alternatively, the fuel body 32 can be made up of merely one single fiber—also referred to as monofil—which can equally be formed into three-dimensional bodies.

In the shown exemplary arrangement, the fibers are synthetic fibers of spinnable synthetic materials such as polyolefins, especially polypropylene, polyethylene, polybutadiene and/or polystyrene, as well as polyamides, vinyl polymers, especially polyvinyl acetate, polyurethane, polyether, polyester, especially polyethylene terephthalate, polytrimethylene terephthalate and polybutylene terephthalate, polyimides, polyamide imide, aramids, polyacrylates, polyacrylic nitrile, polybenzimidazole, polyurea, melamine resins, polyvinyl alcohol and/or polymethacrylate.

Alternatively, also natural fibers can be used, for example fibers obtained from cellulose or starch, wherein they can also be chemically re-treated. Those fibers comprise especially cellulose ether, cellulose ester, cellulose acetate, cellulose acetate butyrate, cellulose propionate, nitrocellulose, phenols, polysaccharides and polyacetals. Basically, also wool fibers are suited.

The density of the gas-permeable fuel body 32 ranges from 10 to 90 kg/m$^3$. In one exemplary arrangement, the density of the gas-permeable fuel body 32 ranges from 10 to 60 kg/m$^3$. Since the conversion of the gas-permeable fuel body 32 made up of fibers with oxygen also provides a reaction heat that is higher at least by the factor 8 than the conversion of a typical pyrotechnical solid propellant, already very small amounts of the gas-permeable fuel body 32 are sufficient to release the energy required to heat the compressed gas 24 and/or to generate an excess pressure inside the pressure chamber 22 to destroy the membrane 16.

In one exemplary arrangement, the compressive hardness of the gas-permeable fuel body 32 is within a range of from 2.0 to 10 kPa. This enables the gas-permeable fuel body 32 to be press-fitted into the housing 12 and to be compressed in the radial direction. In one exemplary arrangement, the compression is of up to 10%, so that the gas-permeable fuel body 32 is held inside the pressure chamber 22 by force fit. In addition, or alternatively, the gas-permeable fuel body 32 can be fixed by adhesive bonding or by forming a friction surface (not shown) in the housing 12.

The fuel body 32 here fills about 50% of the volume of the pressure chamber 22. However, the amount of the gas-permeable fuel body 32 in the pressure chamber 22 can be freely selected depending on the desired gas generator output, for example in a range of from 10 to 95% of the volume of the pressure chamber 22. In one exemplary arrangement, the gas-permeable fuel body 32 can completely fill the pressure chamber 22.

Upon activation of the gas generator 10, the igniter 14 receives an electrical signal in a known way to ignite the gas generator 10. The involved sudden increase in pressure in the igniter 14 initially destroys the igniter membrane 30. At the same time, the gas-permeable fuel body 32 is heated in the pressure chamber 22 by the hot gases and/or particles released by the igniter 14 so that a conversion of the fuel 31 with the gaseous oxidant contained in the pores of the gas-permeable fuel body 32 will start. The heat generation occurring during said conversion heats the compressed gas 24 so that excess pressure is formed. Said excess pressure causes the membrane 16 to be opened, and the heated compressed gas 24 can flow out of the pressure chamber 22 via the diffusor 18 and the outflow openings 20 into the environment and can actuate the safety device.

As an alternative, the activation of the gas generator 10 can be provided to trigger a shockwave that propagates through the fuel body 32 and the pressure chamber 22 and opens the membrane 16 very quickly and reliably. The shockwave can emanate from the igniter membrane 30 or else from the igniter 14 itself. The fuel body 32 can be used to intensify and/or control the shockwave. The reaction energy from the subsequent conversion of the gas-permeable fuel body 32 can serve for heating the compressed gas 24 flowing out of the gas generator 10. The compressed gas 24 in this variant may consist of the inert gas, i.e., may be free from gaseous oxidant. The gas-permeable fuel body 32 then adopts only the function of transmitting and/or intensifying the shockwave generated by the igniter 14.

Figure 2:
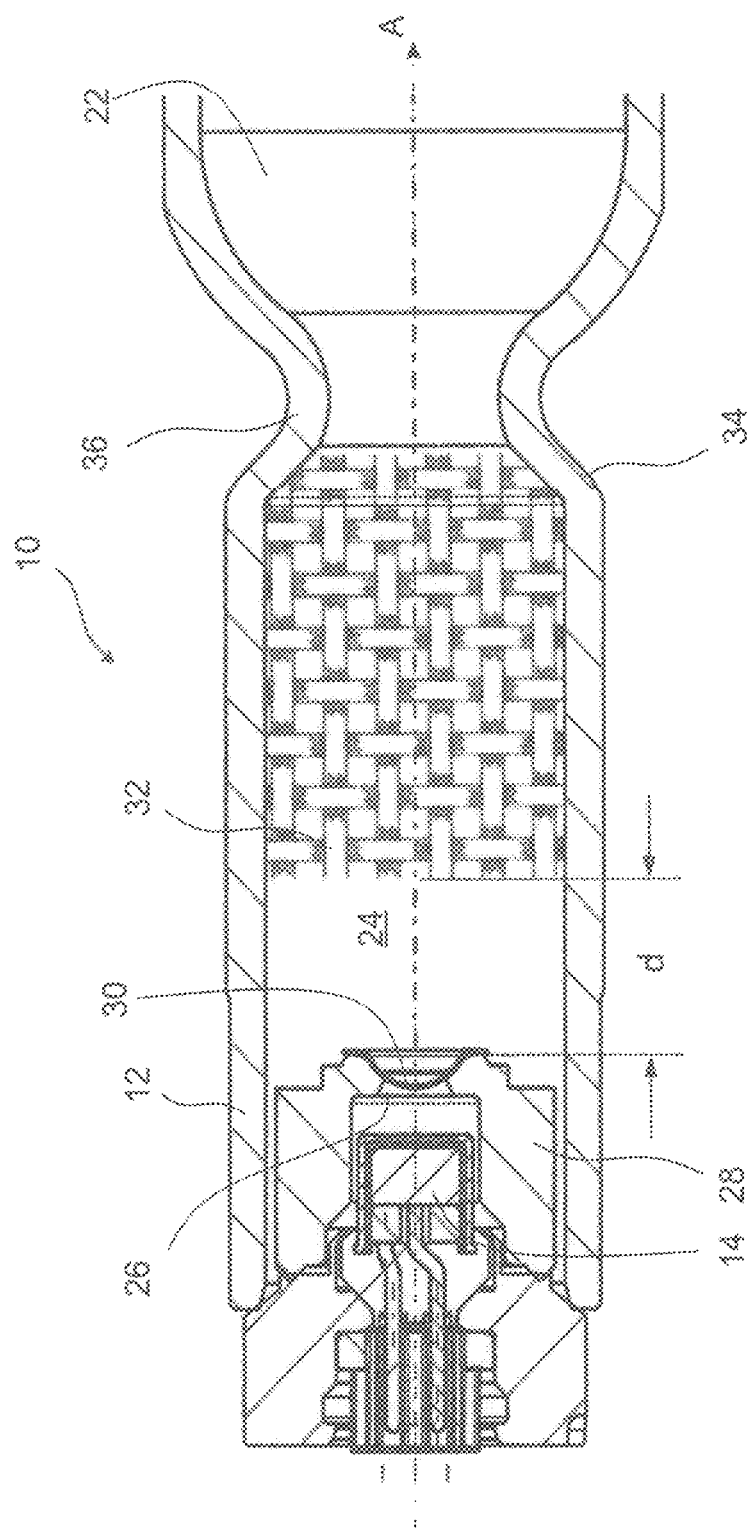
FIG. 2 another exemplary arrangement of a gas generator according to the disclosure having a peripheral annular groove in a housing of the gas generator.

FIG. 2 illustrates another exemplary arrangement of the gas generator 10 according to the disclosure in which the housing 12 is provided with an indentation 34 in the form of a radially peripheral annular groove 36 here. The gas-permeable fuel body 32 in this case extends only to the annular groove 36 and is held by the latter inside the pressure chamber 22. Thus, the peripheral annular groove 36 may serve for indicating the amount of the gas-permeable fuel body 32 contained in the pressure chamber 22 and, thus, the gas generator output.

Otherwise, the remaining structure of the gas generator 10 of FIG. 2 corresponds to the gas generator 10 shown in FIG. 1 above. For the components of the gas generator 10 known from FIG. 1 the same reference numerals are used, and insofar the foregoing explanations are referred to.

Between the igniter membrane 30 and the gas-permeable fuel body 32 a distance d is provided in the arrangement shown in FIG. 2. In one exemplary arrangement, the distance d is about 0.6 times the single inner diameter of the housing 12. In other exemplary arrangements, the distance d may be up to 2 times the single inner diameter of the housing 12. In yet another exemplary arrangement, the distance may be between 0.5 to 1.5 times the single inner diameter of the housing 12. In yet another exemplary arrangement, the distance d may be the single inner diameter of the housing 12.

As an alternative, it is also possible that the fuel body 32 extends to the igniter housing 28 even in this arrangement. In this case, the peripheral annular groove 36 secures the fuel body 32 inside the pressure chamber 22, thus making further means for fixing the gas-permeable fuel body 32 superfluous.

The gas-permeable fuel body 32 can also extend to behind the indentation 34 formed by the peripheral annular groove 36. In this case, too, the annular groove 36 serves for holding the gas-permeable fuel body 32 inside the pressure chamber 22, as the fuel body 32 is radially compressed in the area of the annular groove 36 and thus a positive and/or non-positive connection is formed between the housing 12 and the fuel body 32.

Figure 3:
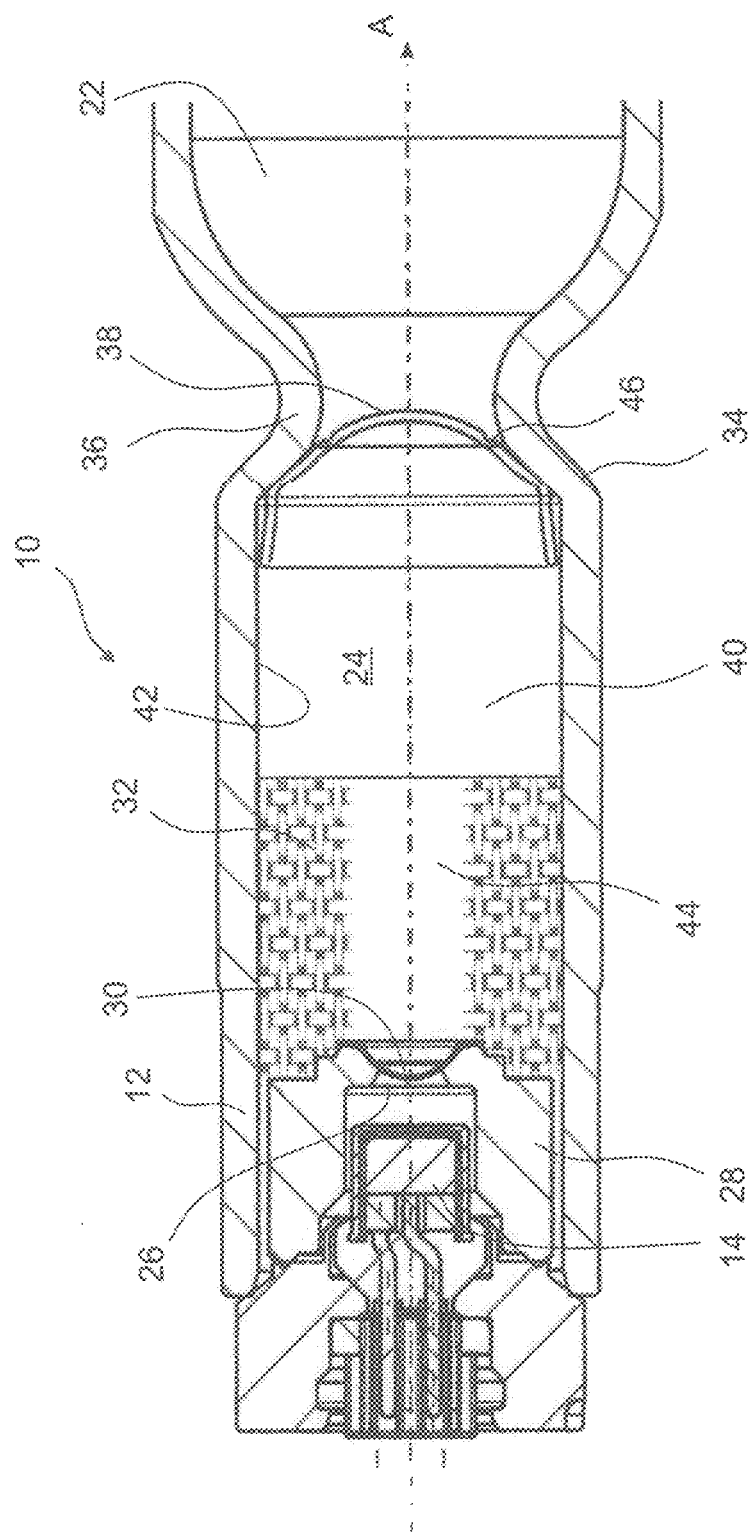
FIG. 3 an exemplary arrangement of a gas generator according to the disclosure comprising a partition element in the pressure chamber.

FIG. 3 illustrates an exemplary arrangement in which the housing 12 of the gas generator 10 is formed with the peripheral annular groove 36, wherein, in addition to the arrangement analogously to FIG. 2, a burst element 38 which subdivides the pressure chamber 22 while forming a combustion chamber 40 adjacent to the igniter 14 is provided at the annular groove 36.

Otherwise, the remaining structure of the gas generator 10 of FIG. 3 corresponds to the gas generators 10 shown in the above FIGS. 1 and 2. For the components of the gas generator 10 known from FIGS. 1 and 2 the same reference numerals are used, and insofar the foregoing explanations are referred to.

The gas-permeable fuel body 32 is received in the combustion chamber 40 and can be fixed, for example by adhesive bonding or by forming a friction surface (not shown here), to an inner wall 42 of the housing 12. In one exemplary arrangement, the gas-permeable fuel body 32 is compressed in the radial direction, however, and thus is fixed by force fit in the portion of the housing 12 delimiting the combustion chamber 40.

In addition, the gas-permeable fuel body 32 has a continuous cavity 44 extending in the axial direction of the gas-permeable fuel body 32. The gas-permeable fuel body 32 is correspondingly provided in the form of a hollow cylinder, alternatively also in the form of plural hollow cylinders or perforated disks of textile materials stacked on top of each other in the axial direction. There may also be provided plural cavities 44 inside the fuel body 32. Such an arrangement of the gas-permeable fuel body 32 is particularly suited for generating or transmitting a shockwave.

The burst element 38 may be further provided with weakened zones 46 configured to be destroyed when the igniter 14 is activated. The burst element 38 may be configured to exhibit a higher bursting pressure than the membrane 16 closing the gas generator 10 off from the outside environment (FIG. 1).

Upon activation of the igniter 14, initially the igniter membrane 30 is destroyed. At the same time, the gas-permeable fuel body 32 is heated in the combustion chamber 40 by the hot gases and/or particles released by the igniter 14 so that a conversion of the fuel with the gaseous oxidant contained in the compressed gas 24 will start, with the gaseous oxidant surrounding the fuel 31 and being in direct contact with the gas-permeable fuel body 32. The heat generation occurring during said conversion of the fuel 31 with the oxidant further heats the compressed gas 24 so that excess pressure is formed which opens the burst element 38 while generating or transmitting a shockwave.

In addition, or alternatively, already a shockwave emanating from the igniter 14 and/or the igniter membrane 30 which destroys or weakens the membrane 16 can be generated. In this case, the conversion of the fuel 31 with the gaseous oxidant in the combustion chamber 40 provides additional thermal energy that counteracts cooling of the compressed gas 24 flowing out of the pressure chamber 22 and expanding. Moreover, additional hot gas for activation of the safety device can be made available from the conversion of the gas-permeable fuel body 32 with the gaseous oxidant.

Figure 4:
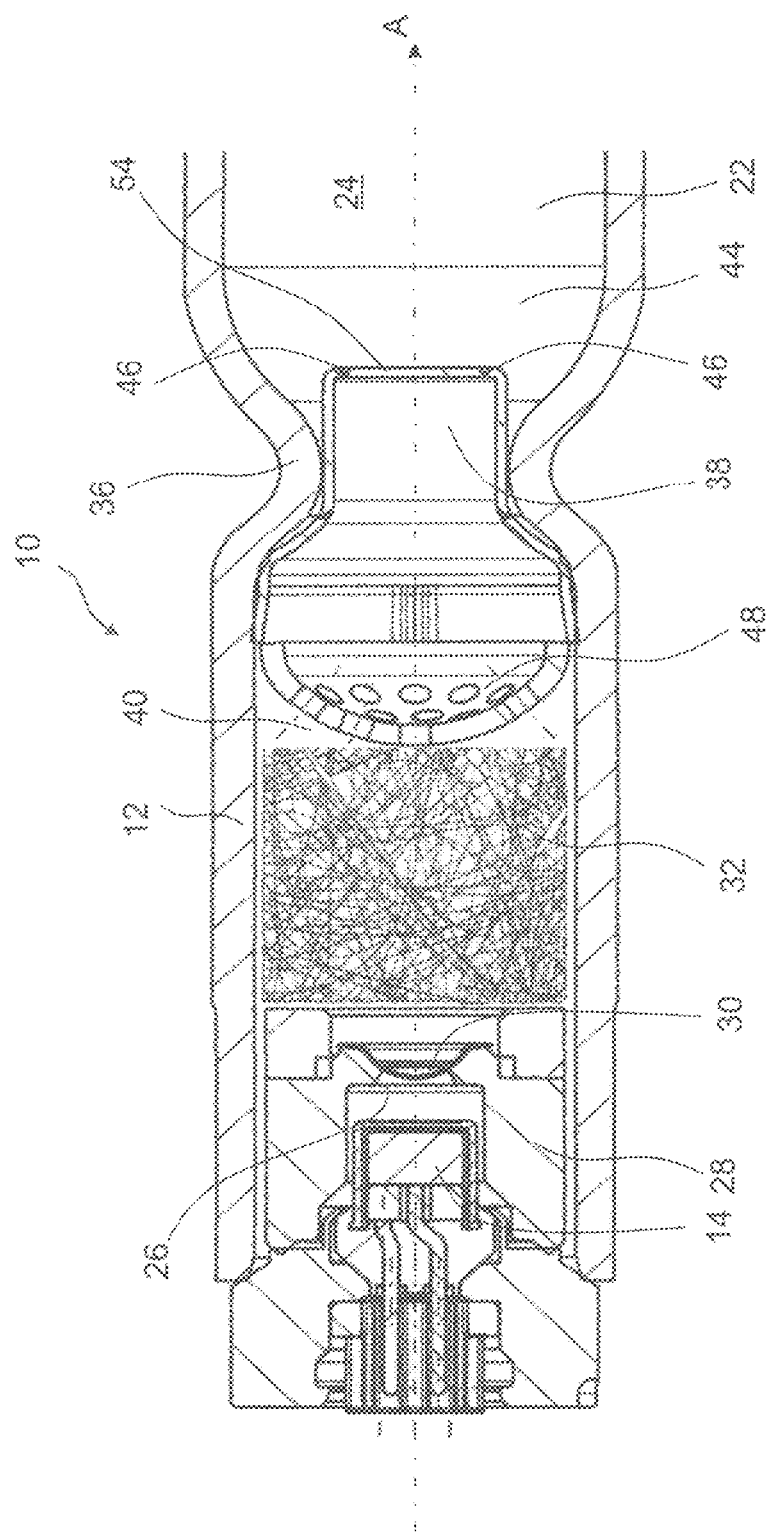
FIG. 4 an exemplary arrangement of a gas generator according to the disclosure comprising a screen disposed in a combustion chamber.

FIG. 4 illustrates another embodiment of the gas generator 10 according to the disclosure. The housing 12 of the gas generator 10 in this case equally shows the peripheral annular groove 36. In addition, a screen 48 arranged in the combustion chamber 40 opposite to the igniter 14 is provided ahead of the burst element 38. The screen 48 serves to retain combustion residues from the combustion of the gas-permeable fuel body 32 or the igniter 14 in the combustion chamber 40.

Otherwise, the remaining structure of the gas generator 10 of FIG. 4 corresponds to the gas generators 10 shown in the above FIGS. 1 to 3. For the components of the gas generator 10 known from FIGS. 1 to 3 the same reference numerals are used, and insofar the foregoing explanations are referred to.

The gas-permeable fuel body 32 in this shown arrangement is a non-woven arranged inside the combustion chamber 40 in the form of a solid cylinder. The gas-permeable fuel body 32 in the form of a solid cylinder may be punched or provided as a lap, for example. When the gas-permeable fuel body 32 is a non-woven, this non-woven can be solidified by needle-punching, entangling or punctual bonding with a binder, for example, thereby increasing the mechanical loadability of the gas-permeable fuel body 32. Alternatively, instead of a non-woven, also a laid fabric, a wadding, a felt or a fuel 31 described in the preceding exemplary arrangements can serve as material for the fuel body 32. Non-woven fabrics, felts and wadding can be produced of natural fibers and/or synthetic fibers according to known methods. The fibers may be present in the form of endless fibers, spun fibers of limited length, staple fibers or in the form of cut yarns and can be further processed into a non-woven, a felt or a wadding.

The burst element 38 provided with overflow openings for pressure compensation between the combustion chamber 40 and the remaining portion of the pressure chamber 22 is hat-shaped in the embodiment shown here. A lid 54 of the burst element 38 includes weakened zones 46 configured to tear at a higher bursting pressure than the membrane 16 closing the gas generator 10 off from the outside environment (FIG. 1).

As in the afore-mentioned arrangements, upon activation of the igniter 14, a shockwave can already be generated by the igniter itself. In addition, or alternatively, the igniter membrane 30 closing the igniter 14 off the combustion chamber 40 may be designed so that a shockwave is triggered when the igniter membrane 30 bursts.

In addition, even when the burst element 38 is opened, a shockwave for opening the membrane 16 can be generated. The hat-shaped design of the burst element 38 results in a somewhat larger volume of the combustion chamber 40 than the dome-shaped burst element 38 shown in FIG. 3, thus allowing a more stable shockwave to be generated.

Figure 5:
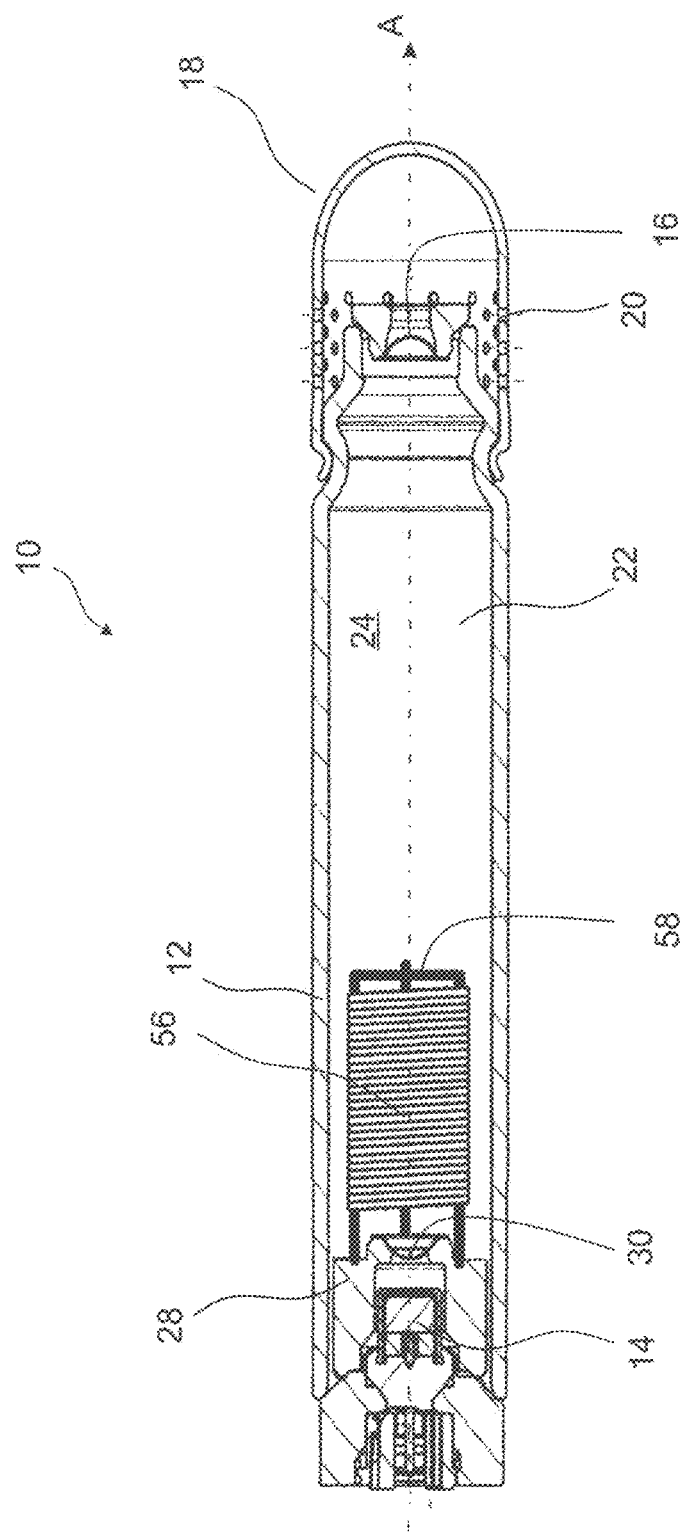
FIG. 5 an exemplary arrangement of a gas generator according to the disclosure comprising a fuel body wound onto a carrier.

In FIG. 5, an alternative exemplary arrangement of the gas generator 10 is shown in which the gas-permeable fuel body 32 is wound onto a carrier 58 in the form of a fuel thread 56. The fuel thread 56 may also be in the form of a monofil, yarn or twist.

Otherwise, the remaining structure of the gas generator 10 of FIG. 5 corresponds to the gas generators 10 shown in the above FIGS. 1 to 4. For the components of the gas generator 10 known from FIGS. 1 to 4 the same reference numerals are used, and insofar the foregoing explanations are referred to.

A reel onto which a fiber, a thread, a yarn and/or a twist is wound is suited, for example, as carrier 58 in order to form a thread lap as gas-permeable fuel body 32. The carrier 58 can bear against the igniter housing 28 or against the housing 12 of the gas generator 10, for example, and can be fixed in its position.

In this arrangement, too, it is possible that the housing 12 is provided with an indentation 34 which may be in the form of a radially peripheral annular groove 36. In this case, the carrier 58 can additionally or exclusively bear against the inner wall 42 of the housing 12 level with the annular groove 36.

Figure 6:
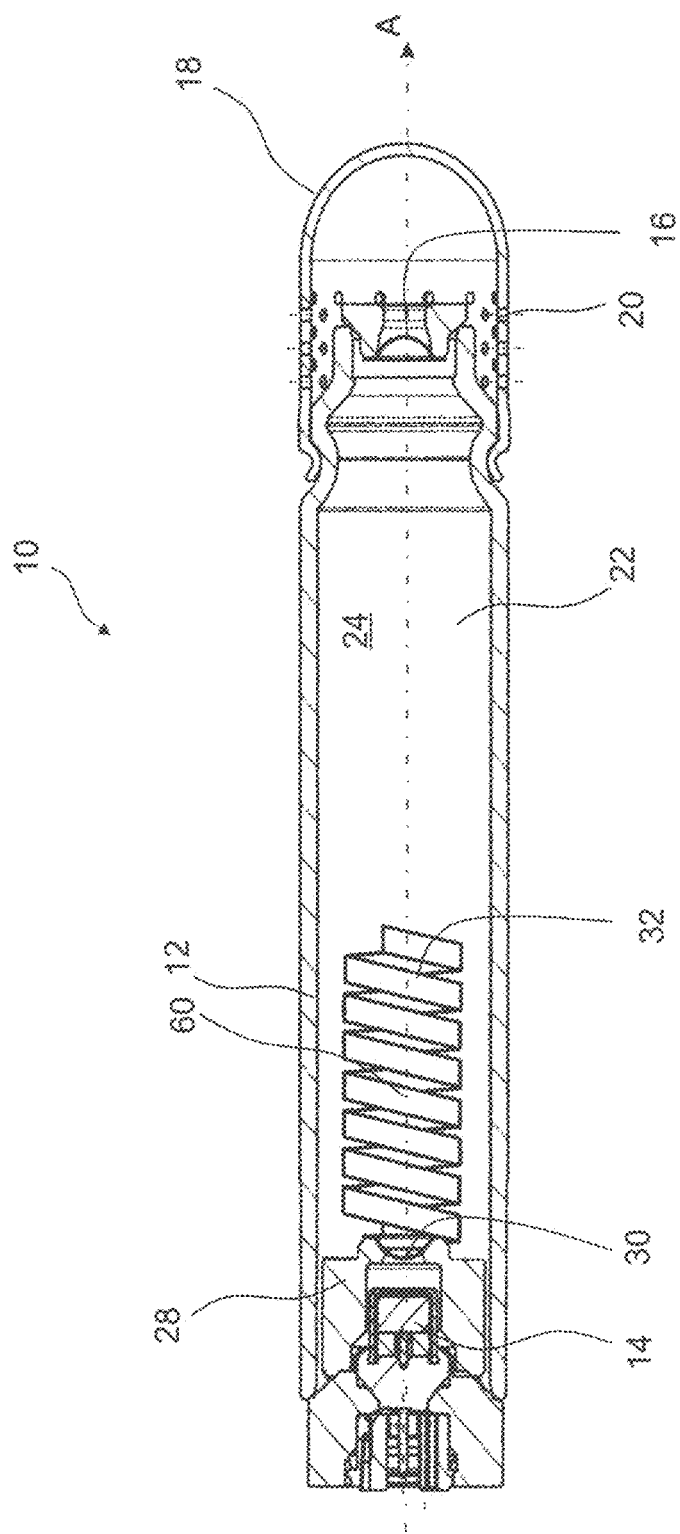
FIG. 6 another exemplary arrangement of a gas generator according to the disclosure comprising a fuel body in the form of a fuel coil.
Figure 7:
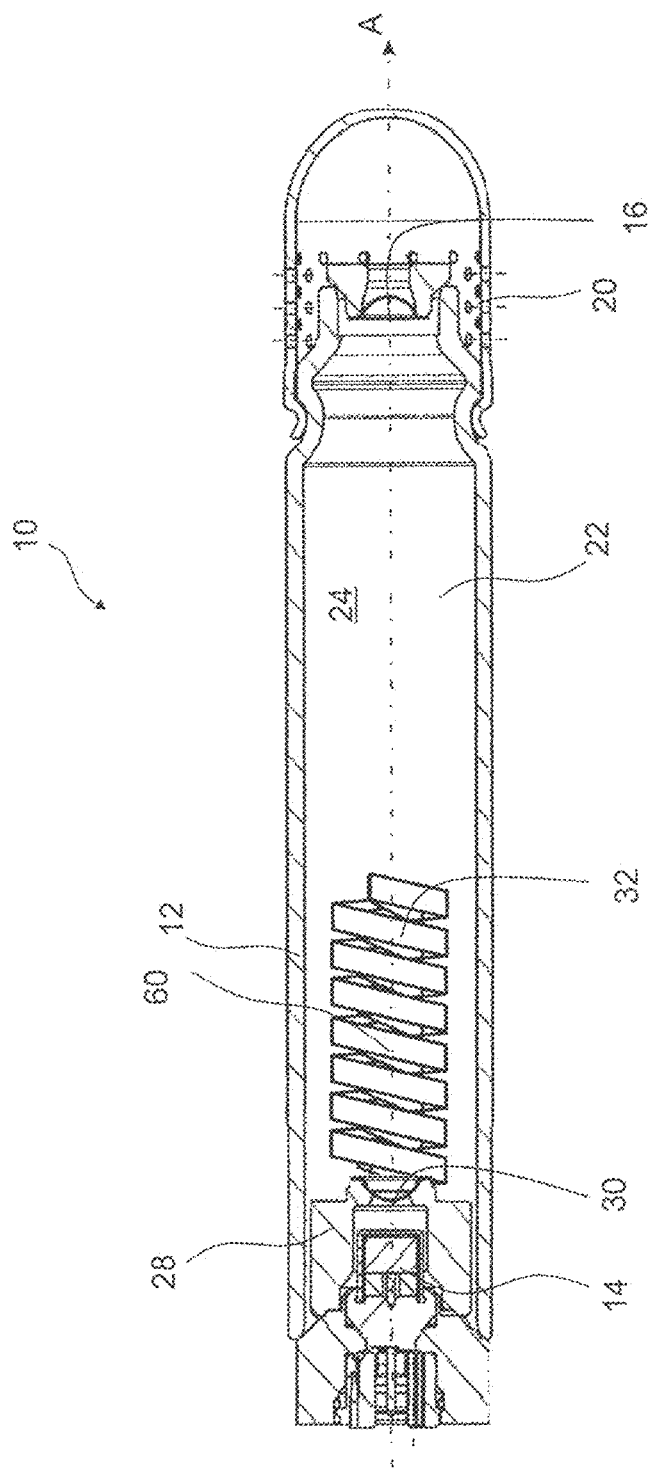
FIG. 7 an alternative exemplary arrangement of a gas generator according to the disclosure comprising a fuel body in the form of a fuel coil.

In FIGS. 6 and 7, further alternative exemplary arrangements of the gas generator 10 are shown in which the gas-permeable fuel body 32 is provided in the form of self-supporting fuel coils 60 of a textile material.

Otherwise, the remaining structure of the gas generator 10 of the FIGS. 6 and 7 corresponds to the gas generators 10 shown in the above FIGS. 1 to 5. For the components of the gas generator 10 known from the FIGS. 1 to 5 the same reference numerals are used, and insofar the foregoing explanations are referred to.

When the gas-permeable fuel body 32 is provided in the form of a self-supporting textile fuel coil 60, the carrier 58 can be saved. At the same time, strips composed of fibers which are mounted in the desired spiral shape can be used as fuel 31. Via the width of the strip from which the fuel coil 60 is formed and via the distance of two windings of the fuel coil 60 the combustion characteristic of the gas-permeable fuel body 32 can be adjusted.

In this exemplary arrangement, it is especially advantageous when the textile fuel coil 60 is composed of microporous fibers to increase the surface of the gas-permeable fuel body 32.

When the housing 12 in this exemplary arrangement is provided with an indentation 34 that may be in the form of a radially peripheral annular groove 36, one end of the fuel coil 60 can bear against the igniter housing 28 and the other end of the fuel coil 60 can bear against the inner wall 42 of the housing 12 level with the annular groove 36.

The textile fuel coil 60 can be, as shown in FIG. 7, a double fuel coil 60. To this end, the fuel coil 60 is folded at the end opposite to the igniter housing 28 such that an opposite-sense second coil having a smaller diameter is formed inside the fuel coil 60.

The fuel coil 60 may include an additional carrier by which the shape of the fuel coil 60 is predetermined and/or stabilized. The carrier itself can also exhibit a conversion with the oxidant and, in this way, contribute to the reaction heat.

Figure 8:
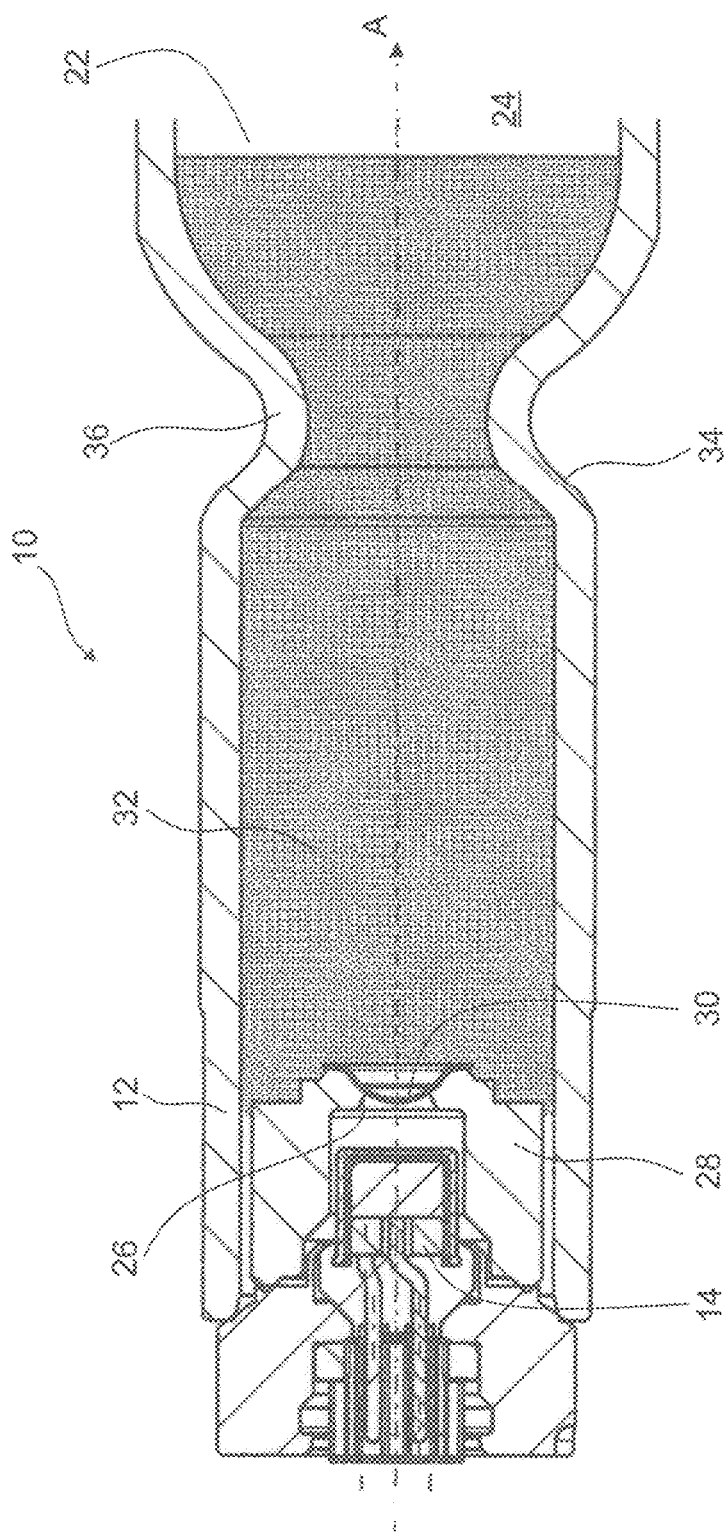
FIG. 8 another exemplary arrangement of a gas generator according to the disclosure comprising a peripheral annular groove in a gas generator housing.

FIG. 8 illustrates another exemplary arrangement of the gas generator 10 according to the disclosure in which the housing 12 is provided with an indentation 34 in the form of a radially peripheral annular groove 36 here. The gas-permeable fuel body 32 extends, in this exemplary arrangement, in the axial direction A beyond the annular groove 36 and can completely or partially fill the pressure chamber 22. In this case, the annular groove 36 also serves for holding the gas-permeable fuel body 32 inside the pressure chamber 22, as the fuel body 32 is radially compressed in the area of the annular groove 36, and, thereby, a positive and/or non-positive connection is formed between the housing 12 and the fuel body 32.

Figure 9:
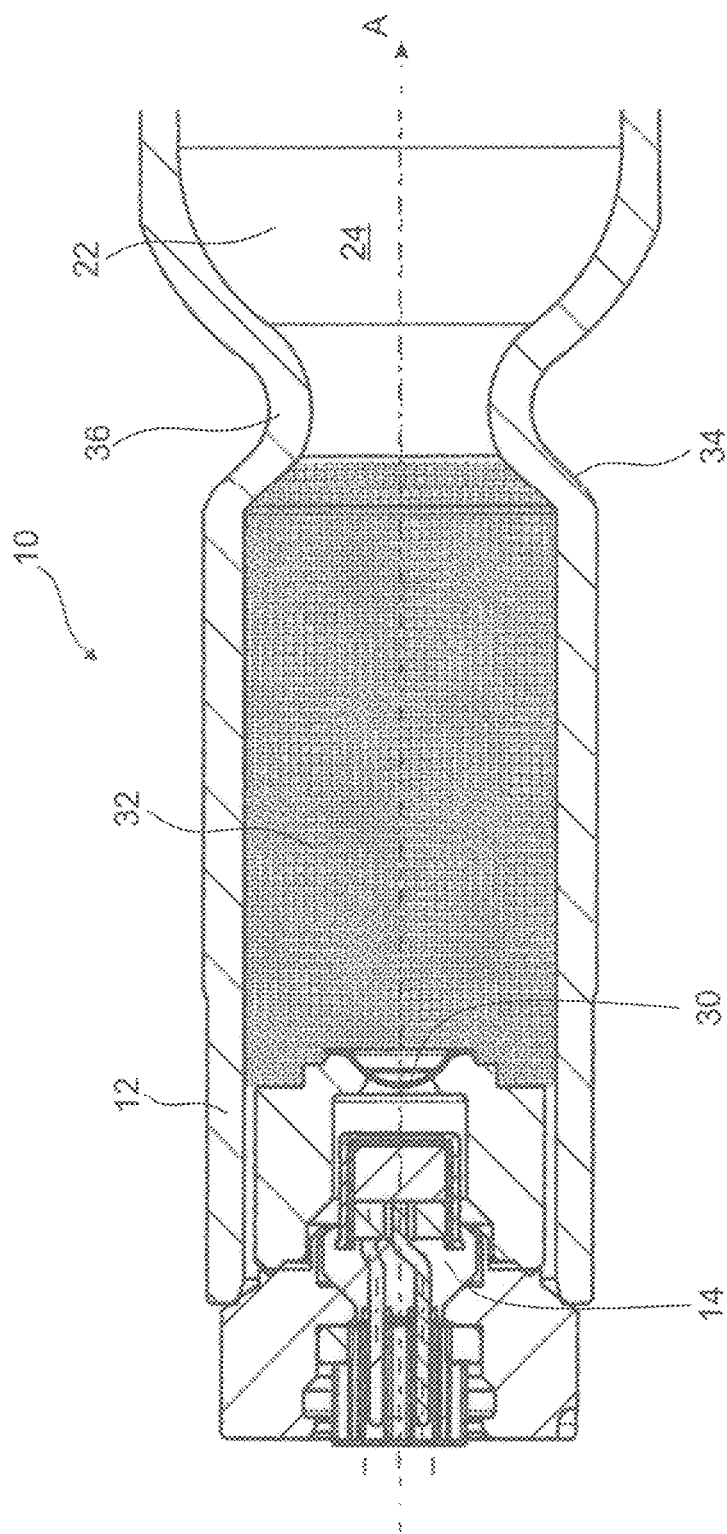
FIG. 9 another exemplary arrangement of a gas generator according to the disclosure comprising a peripheral annular groove for fixing a fuel body.

According to the variant of the gas generator 10 of FIG. 1 shown in FIG. 9, the housing 12 is equally provided with a radially peripheral annular groove 36. The fuel body 32 in this case only extends to the annular groove 36 and is held inside the pressure chamber 22 by the same. Therefore, further means for fixing the fuel body 32 are not necessary in this embodiment. The peripheral annular groove 36 may serve for indicating the amount of the fuel contained in the pressure chamber 22 and thus the gas generator output.

Otherwise, the remaining structure of the gas generator 10 of the FIGS. 8 and 9 corresponds to the gas generators 10 shown in the above FIGS. 1 to 7. For the components of the gas generator 10 known from FIGS. 1 to 7 the same reference numerals are used, and insofar the foregoing explanations are referred to.

Figure 10:
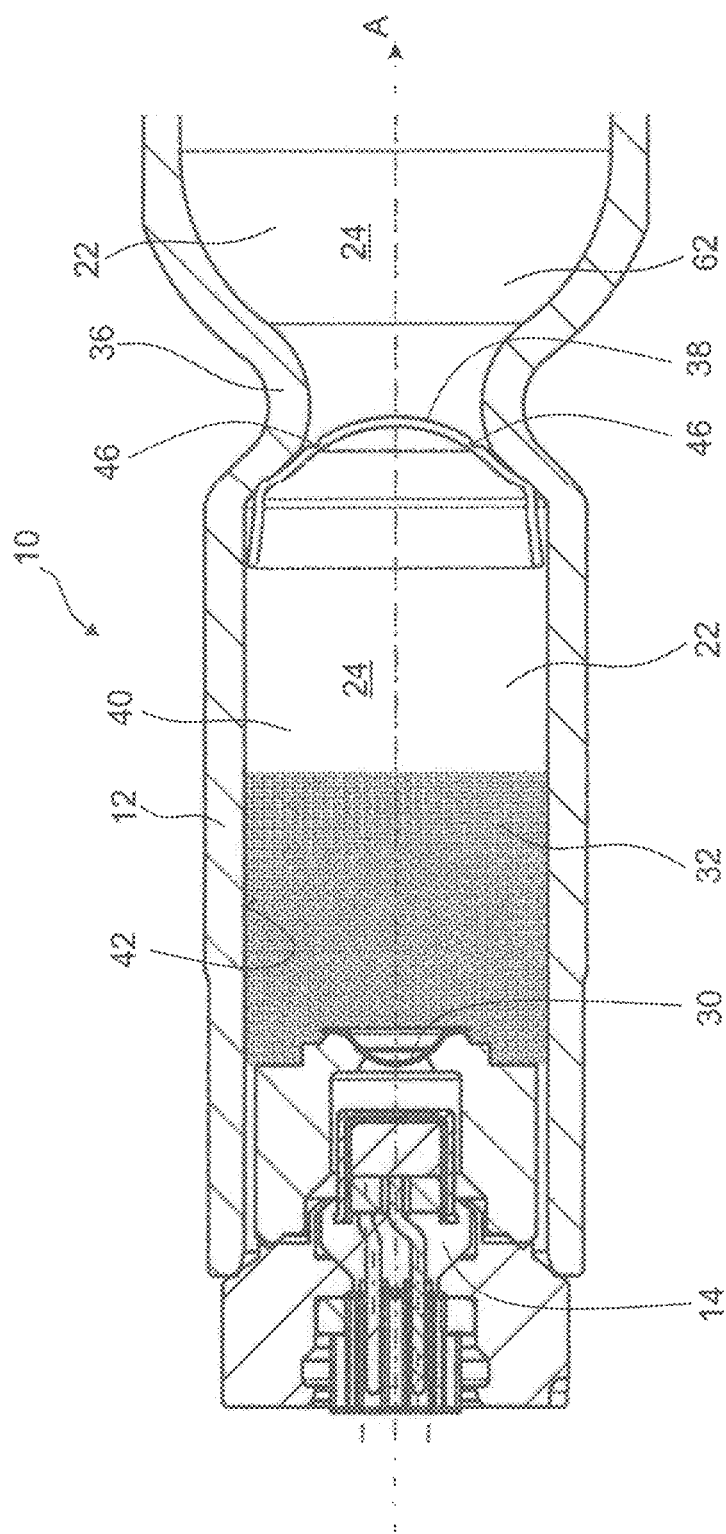
FIG. 10 another exemplary arrangement of a gas generator according to the disclosure comprising a partition element in a pressure chamber.

FIG. 10 illustrates another exemplary arrangement in which the housing 12 of the gas generator 10 is formed with the peripheral annular groove 36, wherein, in addition to the arrangement according to FIG. 9, a burst element 38 that subdivides the pressure chamber 22 while forming a combustion chamber 40 adjacent to the igniter 14 is provided at the annular groove 36. The gas-permeable fuel body 32 is received in the combustion chamber 40 and can be fixed to an inner wall 42 of the housing 12 for example by adhesive bonding or by forming a friction surface (not shown here). In one exemplary arrangement, the gas-permeable fuel body 32 is compressed in the radial direction, however, and thus is fixed by force fit in the portion of the housing 12 delimiting the combustion chamber 40.

The partition between the pressure chamber portion 62 of the pressure chamber 22 only containing the compressed gas with the gaseous oxidant and the combustion chamber 40 by the burst element 38 is not pressure-tight, however. In particular, overflow openings or overflow passages (not shown) can be provided in the burst element 38 to enable pressure compensation between the pressure chamber portion 62 and the combustion chamber 40. In particular, those overflow passages can be disposed in the axial direction along a portion of the outer periphery of the burst element 38. The burst element 38 may further be provided with weakened zones 46 which are configured to be destroyed during or immediately after activation of the igniter 14. The burst element 38 may be configured to have a higher bursting pressure than the membrane 16 closing the gas generator 10 off the outside environment.

Otherwise, the remaining structure of the gas generator 10 of the FIG. 10 corresponds to the gas generators 10 shown in the above FIGS. 1 to 9. For the components of the gas generator 10 known from FIGS. 1 to 7 the same reference numerals are used, and insofar the foregoing explanations are referred to.

Figure 11:
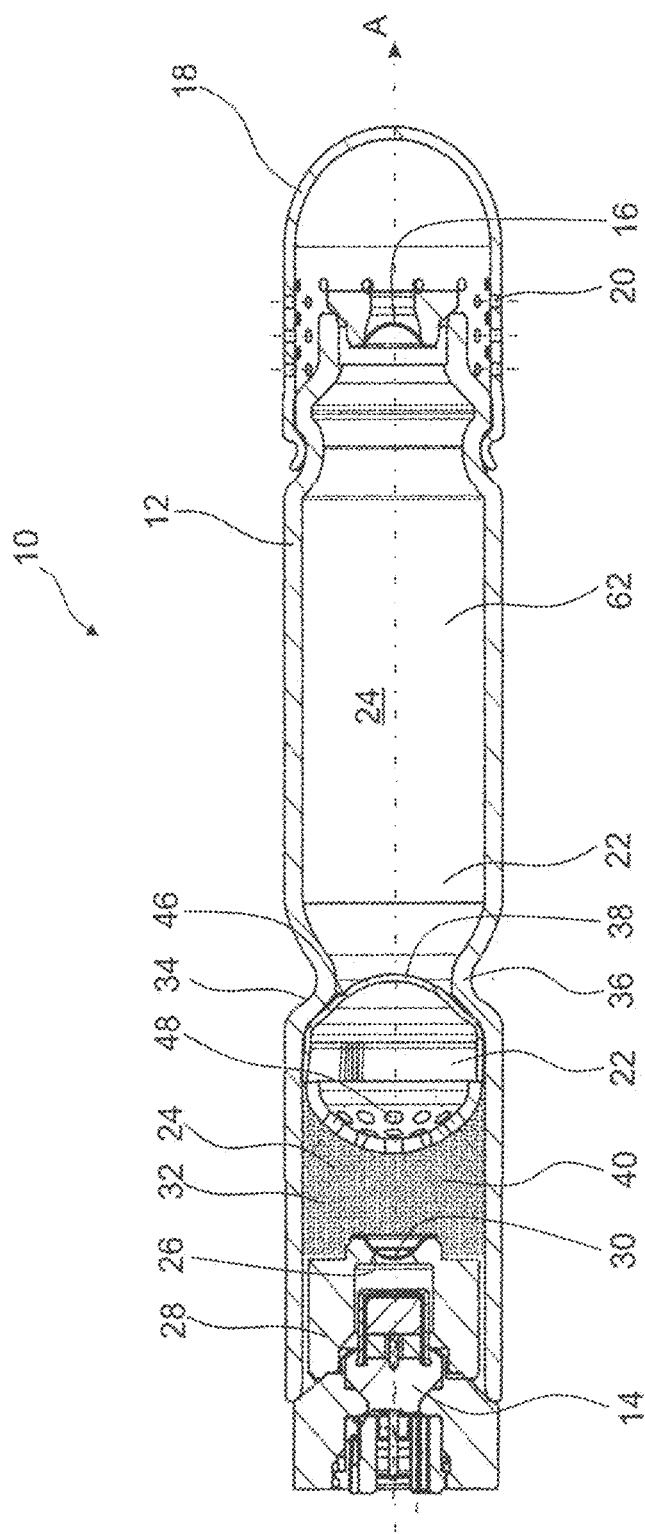
FIG. 11 another exemplary arrangement of a gas generator according to the disclosure comprising a screen disposed in a combustion chamber.

FIG. 11 illustrates another exemplary arrangement of the gas generator 10 according to the disclosure. In this Figure, the gas generator 10 equally includes an elongate cylindrical housing 12 at the first axial end of which an igniter 14 is provided and at the second axial end of which the housing 12 is closed by a membrane 16 against the outside environment of the gas generator 10. A diffusor 18 provided with outflow openings 20 is connected to the housing 12 in the axial direction and guides the gas flowing out of the diffusor 18 to the safety device to be activated (not shown).

The housing 12 delimits a pressure chamber 22 that is adjacent to the igniter 14 in the axial direction A. The pressure chamber 22 is filled with compressed gas 24. The compressed gas 24 comprises at least one inert gas such as argon, helium and/or nitrogen, or any other suitable gas mixture, and moreover can contain a gaseous oxidant. The gaseous oxidant is predominantly (>50 mol %) composed of oxygen.

The igniter 14 is separated pressure-tightly and gas-tightly from the pressure chamber 22. For this purpose, an opening 26 is closed in an igniter housing 28 in which the igniter 14 is accommodated toward the pressure chamber 22 by an igniter membrane 30.

The housing 12 forms the outer housing of the gas generator 10 and is provided with a peripheral annular groove 36 on which a burst element 38 is held. The burst element 38 partitions the pressure chamber 22, forming a combustion chamber 40 adjacent to the igniter 14 in the axial direction A. The gas-permeable fuel body 32 is received in the combustion chamber 40. In addition, a screen 48 which is disposed in the combustion chamber 40 opposite to the igniter 14 is provided ahead of the burst element 38.

Such gas generator may especially be configured so that a shockwave which quickly and safely opens the membrane 16 is triggered by the destruction of the burst element 38.

As an alternative to the arrangement shown in FIG. 11, the burst element 38 may also be dropped. Then the combustion chamber and the pressure chamber are separated from each other only by the screen 48 which may be fixed to the peripheral annular groove 36. Moreover, a pressure compensation is brought about via the screen 48 so that the gas-permeable fuel body 32 is in direct contact with the compressed gas 24 and the oxidant contained therein.

Otherwise, the gas-permeable fuel body 32 and the compressed gas 24 are configured as described in connection with the FIGS. 1 to 10.

When the gas generator 10 is activated, the igniter 14 receives an electric signal in the known way to ignite the gas generator 10. The involved sudden increase in pressure within the igniter 14 initially destroys the igniter membrane 30. At the same time or immediately afterwards, the gas-permeable fuel body 32 is heated in the combustion chamber 40 by the hot gases and/or particles released by the igniter 14 so that a conversion of the fuel with the gaseous oxidant contained in the openings of the gas-permeable fuel body 32 will start. The heat generation occurring during said conversion heats the compressed gas 24 so that excess pressure is formed. Said excess pressure initially causes the burst element 38 to be destroyed and then the membrane 16 to be suddenly opened. The heated compressed gas 24 then can flow out of the pressure chamber 22 via the diffusor 18 and the outflow openings 20 to the environment and can actuate the safety device.

The destruction of the burst element 38 can further trigger a shockwave which propagates through the pressure chamber portion 62 and very quickly opens the membrane 16.

The shockwave can emanate already from the igniter membrane 30 or else from the igniter 14 itself. Then the fuel body 32 can be used to intensify and/or control the shockwave. If the compressed gas 24 contains a gaseous oxidant, the reaction energy resulting from the subsequent conversion of the gas-permeable fuel body 32 may serve for heating the compressed gas flowing out of the gas generator 10.

Figure 12:
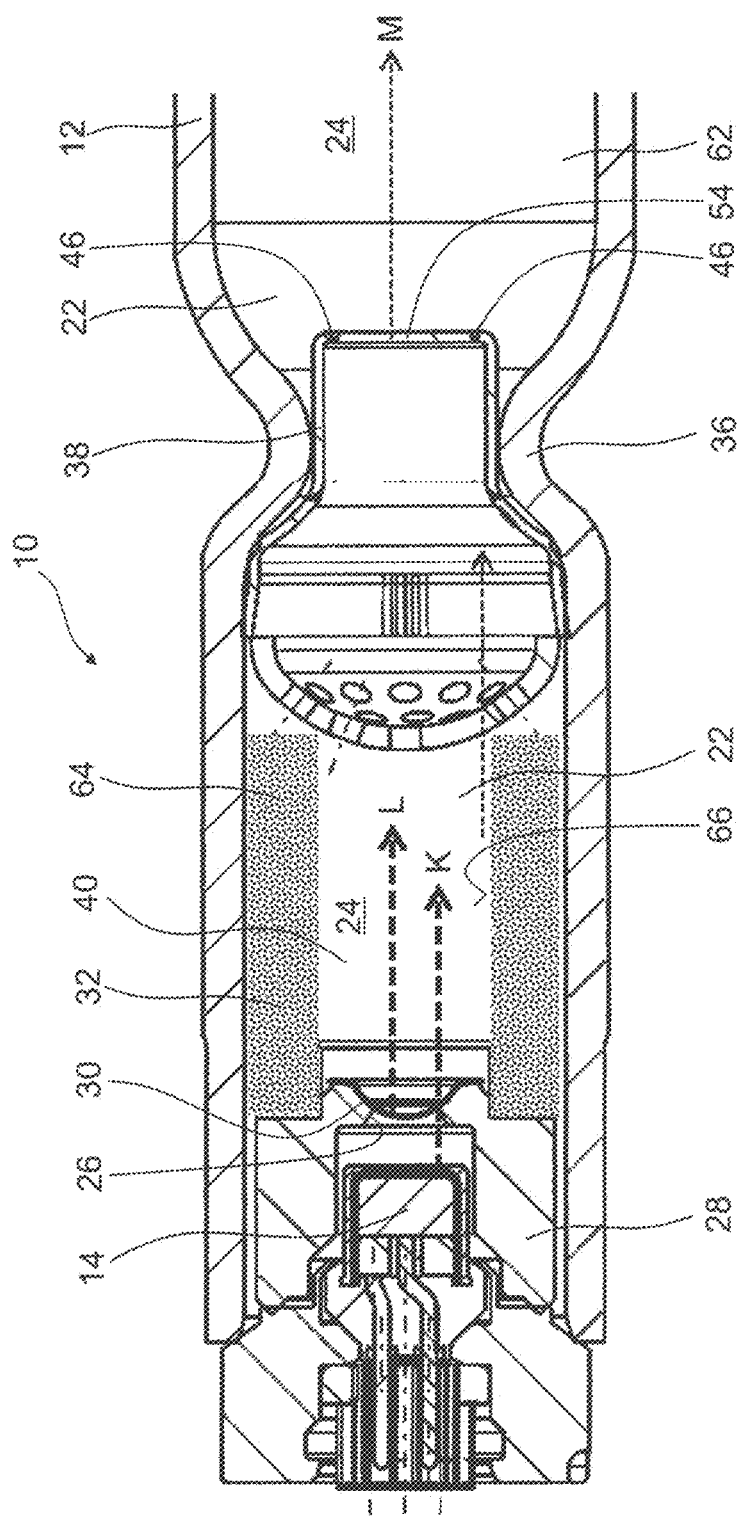
FIG. 12 a partial view of an exemplary arrangement of a gas generator according to the disclosure configured to generate a shockwave.

FIG. 12 illustrates a variant of the gas generator 10 of FIG. 11 that may be formed in different ways for generating a shockwave. The gas-permeable fuel body 32 received in the combustion chamber 40 is in the form of a hollow cylinder 64 having a continuous opening 66 extending in the axial direction A. However, the gas-permeable fuel body 32 may also be present as a massive block, viz. free from openings and axial through-passages, or may have more than one continuous opening. A heavy-duty igniter can be used as igniter 14. Upon activation of the igniter 14, the shockwave can already be generated by the igniter itself, as indicated by the arrow K. In addition, or alternatively, the igniter membrane 30 closing the igniter 14 off the combustion chamber 40 may be designed so that, when the igniter membrane 30 bursts, a shockwave is triggered, which is denoted with the arrow L.

The burst element 38 is provided with overflow openings for pressure compensation between the combustion chamber 40 and the remaining pressure chamber portion 62 of the pressure chamber 22 is hat-shaped in the exemplary arrangement shown here. The lid of the burst element 38 includes the weakened zones 46 which are configured to tear at a higher bursting pressure than the membrane 16 closing the gas generator 10 off from the outside environment (FIG. 11). Even when the burst element 38 is opened, a shockwave can thus be generated to open the membrane 16, indicated here by the arrow M. The hat-shaped configuration of the burst element 38 results in a somewhat larger volume of the combustion chamber 40 than the dome-shaped burst element 38 shown in FIG. 11, whereby a more stable shockwave can be generated.

When the igniter 14 is activated, initially the igniter membrane 30 is destroyed. At the same time or immediately afterwards, the gas-permeable fuel body 32 is heated in the combustion chamber 40 by the hot gases and/or particles released by the igniter 14 so that a conversion of the fuel 31 with the gaseous oxidant contained in the compressed gas 24 which surrounds the compressed gas 24 and is in direct contact with the gas-permeable fuel body 32 will start. The heat generation occurring during said conversion of the fuel 31 with the oxidant further heats the compressed gas 24 so that excess pressure is formed which opens the burst element 38 while generating a shockwave. The shockwave propagates at very high speed in the pressure chamber 22 and in the pressure chamber portion 62 and directly opens the membrane (FIG. 11). Then the compressed gas 24 flows via the outlet openings 20 in the diffusor 18 to the safety device to be activated.

In addition, or alternatively, already a shockwave emanating from the igniter 14 and/or the igniter membrane 30 can be generated to destroy or weaken the membrane 16. In this case, the conversion of the fuel 31 with the gaseous oxidant in the combustion chamber 40 provides additional thermal energy that counteracts cooling of the compressed gas 24 flowing out of the pressure chamber 22 and expanding. Furthermore, additional hot gas can be made available from the conversion of the gas-permeable fuel body 32 with the gaseous oxidant to activate the safety device.

Otherwise, the remaining structure of the gas generator 10 of the FIGS. 11 and 12 corresponds to the gas generators 10 shown in the above FIGS. 1 to 10. For the components of the gas generator 10 known from FIGS. 1 to 10 the same reference numerals are used, and insofar the foregoing explanations are referred to.

Figure 13:
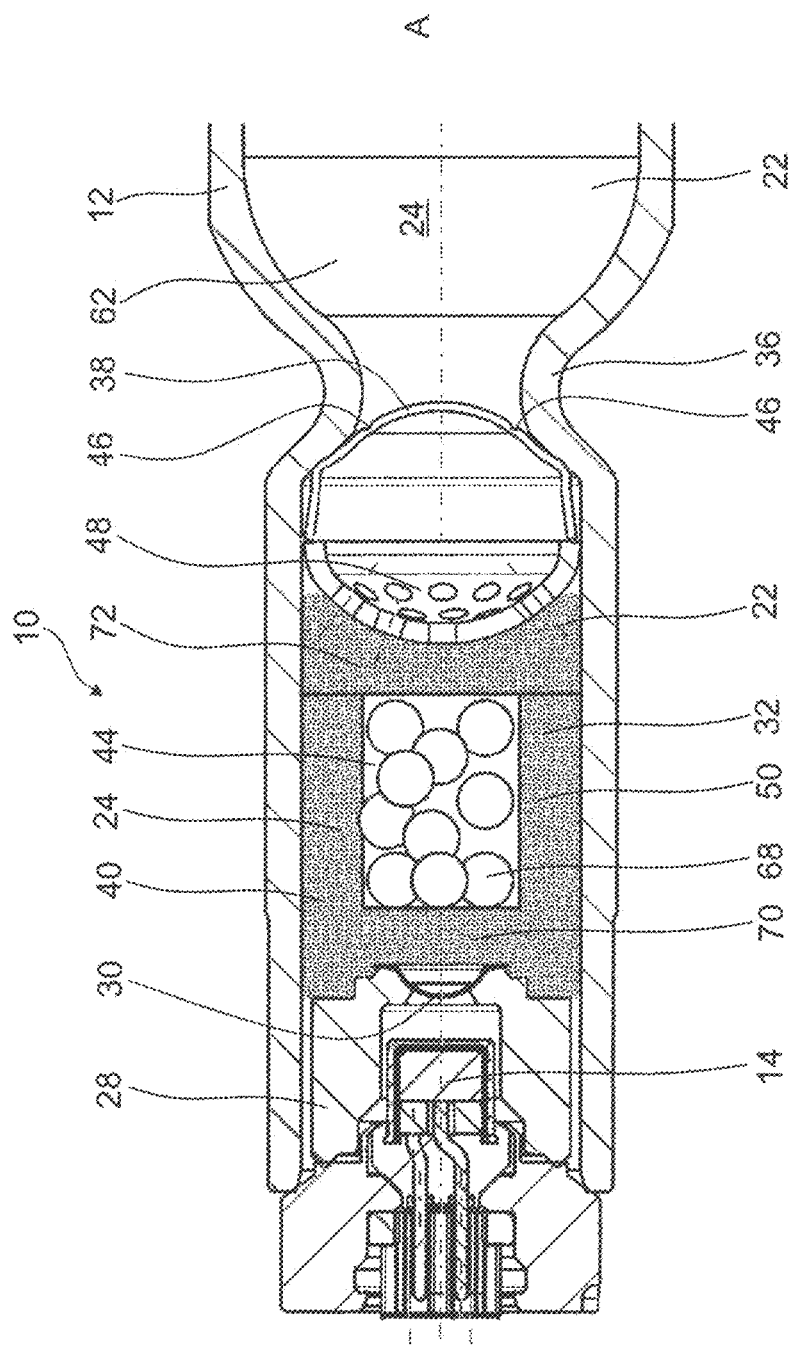
FIG. 13 another exemplary arrangement of a gas generator according to the disclosure comprising a pyrotechnical solid propellant provided along with a gas-permeable fuel body in a combustion chamber.

FIG. 13 illustrates another exemplary arrangement in which a gas-permeable fuel body 32 and a pyrotechnical solid propellant 68 are jointly present in the combustion chamber 40. The gas-permeable fuel body 32 is arranged in this case such that in the fuel body 32 a cavity 44 is formed in which the pyrotechnical solid propellant 68 is received. In particular, the gas-permeable fuel body 32 is in the form of a hollow cylinder the free ends of which are respectively connected to a lid 70 or 72 optionally formed integrally with the hollow cylinder, the lids 70 and 72 being equally made up of the gas-permeable fuel body 32. In this arrangement, too, the screen 48 and/or the burst element 38 may be dropped. The gas-permeable fuel body 32 in the form of a hollow cylinder can positively or non-positively abut on the housing 12 or extend to the annular groove 36 and thus be fixed within the pressure chamber 22.

Figure 14:
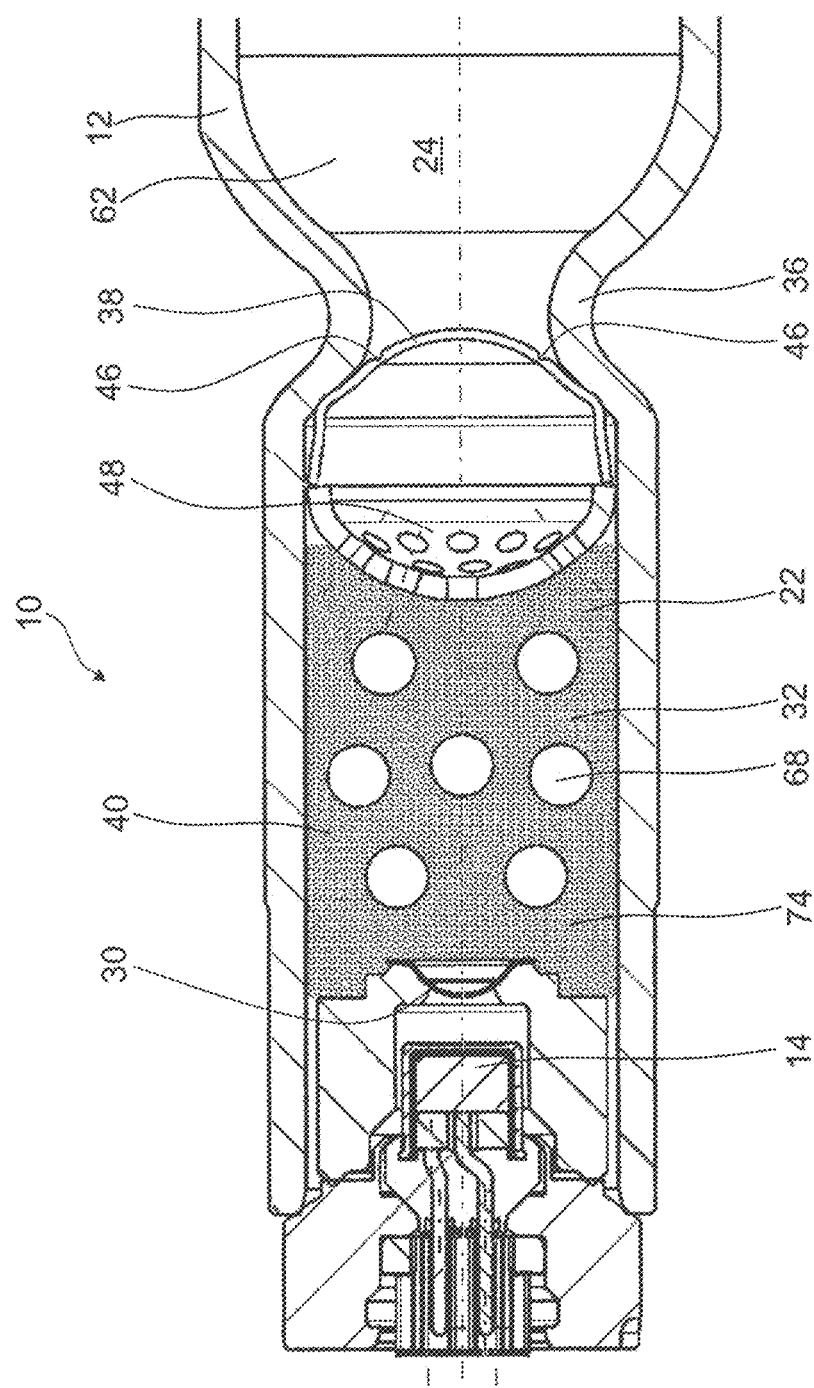
FIG. 14 an exemplary arrangement of a gas generator according to the disclosure comprising pyrotechnical solid propellant integrated in a matrix of a gas-permeable fuel body.

In the exemplary arrangement according to FIG. 14, the gas-permeable fuel body 32 introduced into the combustion chamber 40 forms a matrix 74 in which the pyrotechnical solid propellant 68 is integrated. Instead of the pyrotechnical solid propellant 68, in this arrangement also a powdered metal or other metal bodies, for example in wire shape, foil shape or in another lump shape, can be provided to be integrated in the matrix 74 made of the gas-permeable fuel body 32.

In this exemplary arrangement, the gas-permeable fuel body 32 thus forms, together with the pyrotechnical solid propellant 68 and/or the metallic inclusions, a composite material that is especially easy to handle. In particular, the composite of the pyrotechnical solid propellant 68 spread in the matrix 74 made of the gas-permeable fuel body 32 can be easily held above the annular groove 36 in the pressure chamber 22. Thus, by dispensing with the screen 48 and/or the burst element 38, an especially simple configuration of the gas generator 10 is possible. Such variant is shown in FIG. 15.

The gas generator output can be largely varied via the proportion of the pyrotechnical solid propellant 68 spread in the matrix 74 made of the gas-permeable fuel body 32.

Figure 15:
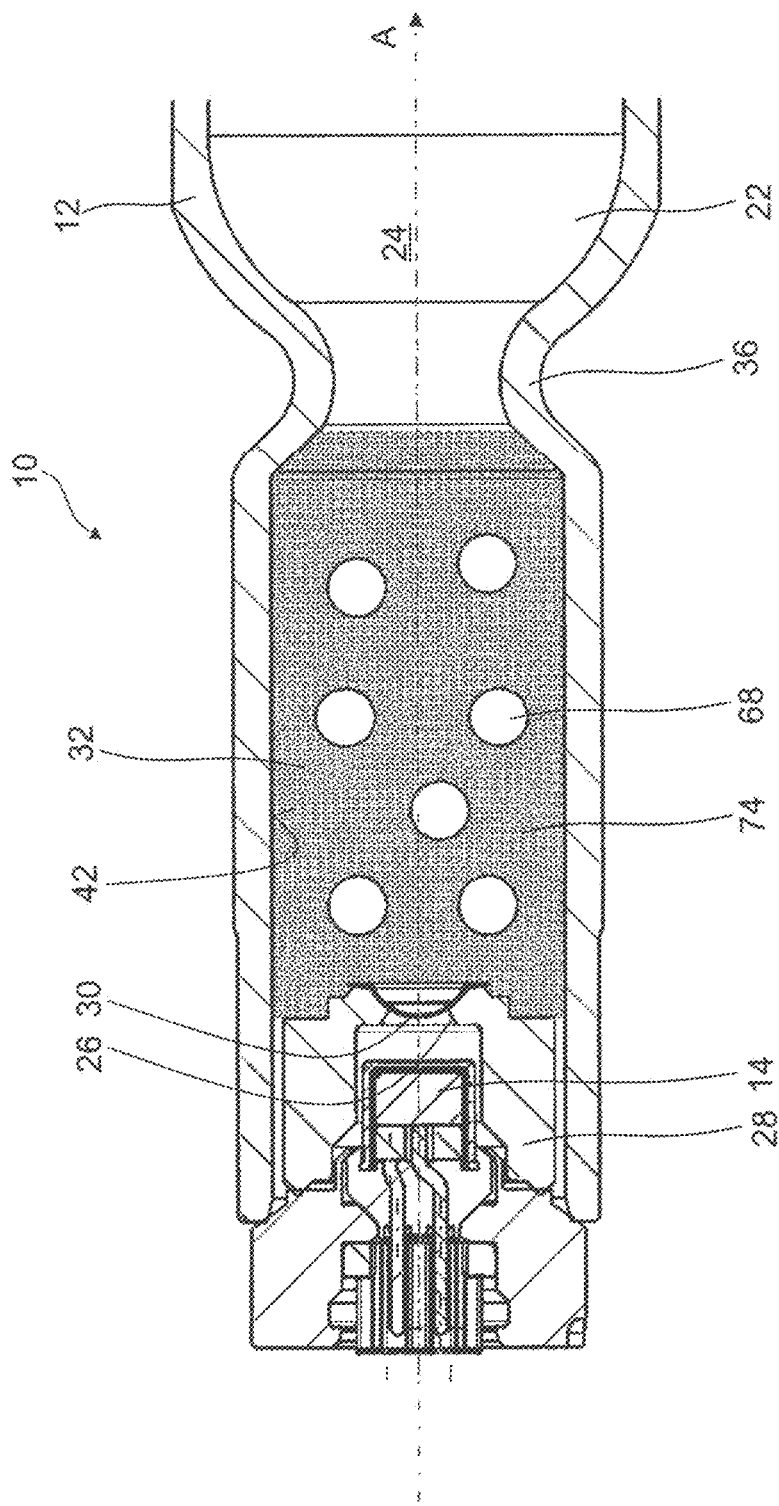
FIG. 15 another exemplary arrangement of a gas generator according to the disclosure comprising pyrotechnical solid propellant integrated in a matrix of a gas-permeable fuel body.

Otherwise, the remaining structure of the gas generator 10 of the FIGS. 13 to 15 corresponds to the gas generators 10 shown in the above FIGS. 1 to 12. For the components of the gas generator 10 known from FIGS. 1 to 12 the same reference numerals are used, and insofar the foregoing explanations are referred to.

Figure 16:
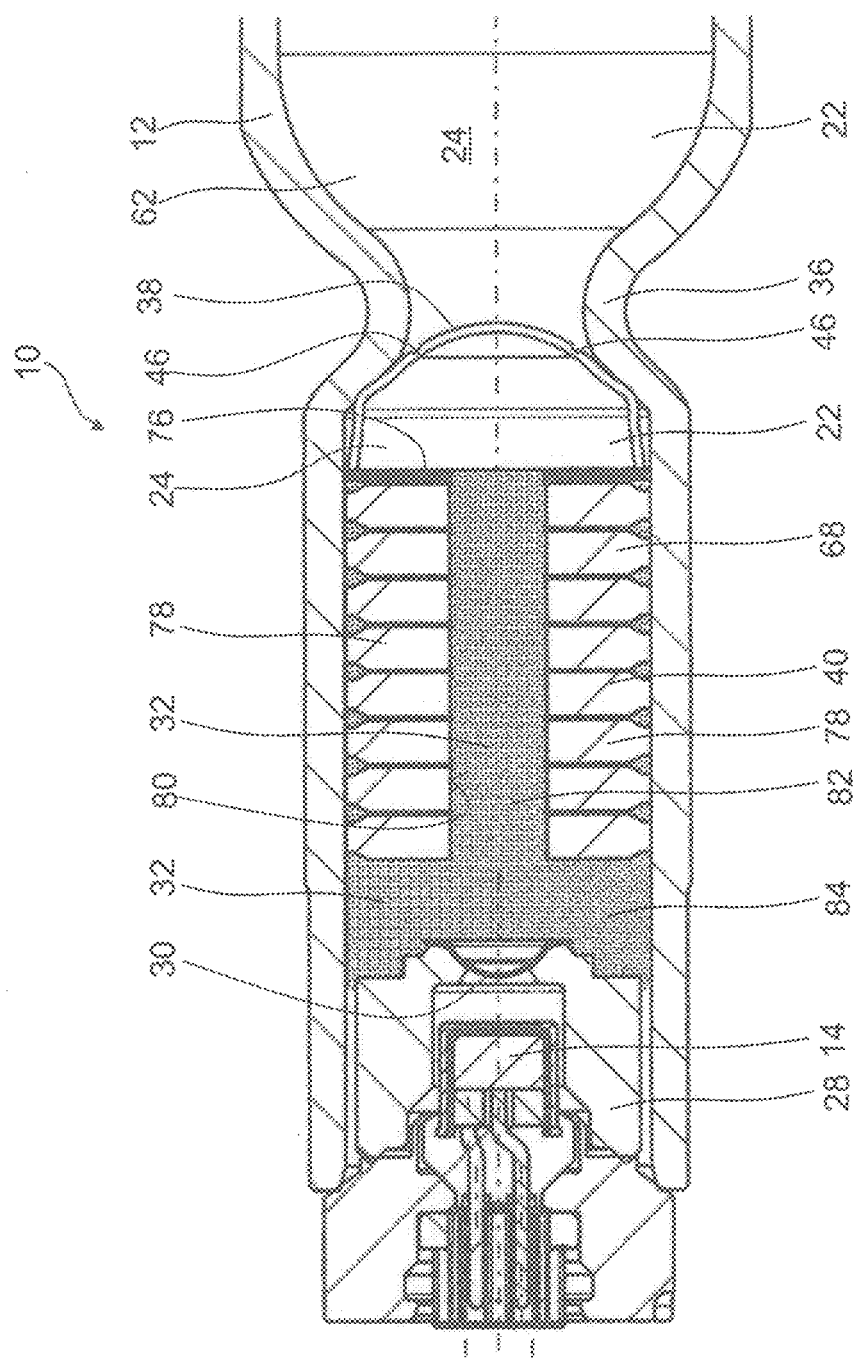
FIG. 16 an exemplary arrangement of a gas generator according to the disclosure in which a gas-permeable fuel body is used as a fixing element and/or volume compensating element for a pyrotechnical solid propellant.

According to the exemplary arrangement illustrated in FIG. 16, the gas generator 10 includes a combustion chamber 40 separated from a pressure chamber portion 62 of the pressure chamber 22 by the burst element 38, the burst element 38 including overflow openings, however, so that the pressure chamber portion 62 and the combustion chamber 40 are in fluid communication with each other. Said overflow openings are not shown in detail, they may extend in the axial direction along the outer periphery of the burst element 38, for example. Alternatively, or additionally, it is also possible for the burst element 38 to include individual material-permeable openings (not shown) having a small diameter in the area of its cap-shaped end, for example. The number and the size of those openings have to be kept so small that a desired formation of a shockwave is not impaired by opening the burst element 38. In addition to the burst element 38, a filter 76 is provided on the side of the combustion chamber 40 opposite to the igniter 14, which filter 76 bears against the burst element 38. The pyrotechnical solid propellant 68 is received in the combustion chamber 40 and is provided as a molded body in the form of propellant rings 78 stacked on top of each other and having a central bore 80. In the axial direction, the propellant rings 78 are held inside the combustion chamber 40 by the filter 76.

The gas-permeable fuel body 32 has a cylindrical portion 82 that engages in the central bore 80 of the propellant rings 78 of the pyrotechnical solid propellant 68. Thus, the gas-permeable fuel body 32 also serves for fixing the pyrotechnical solid propellant 68 inside the combustion chamber 40 in the arrangement shown here. At the same time, the gas-permeable fuel body 32 can also adopt the function of a booster charge.

Moreover, for volume compensation, the gas-permeable fuel body 32 may include a disk-shaped base member 84 that can be arranged on the igniter side in the combustion chamber 40 and formed integrally with the cylindrical portion 82 engaging in the central bore 80 of the propellant rings 78. Alternatively, the base member 84 can be introduced into the combustion chamber 40 separately from the cylindrical portion 82 as a separate volume compensation body. The base member 84 may be partially compressed and, thus, exert pressure in the axial direction upon the propellant rings 78 so that rattling noise is avoided. A volume compensation can be provided in the combustion chamber 40 via the thickness of the disk-shaped base member 84 in the axial direction. Thus, via the gas-permeable fuel body 32 also the gas generator output can be adapted.

Figure 17:
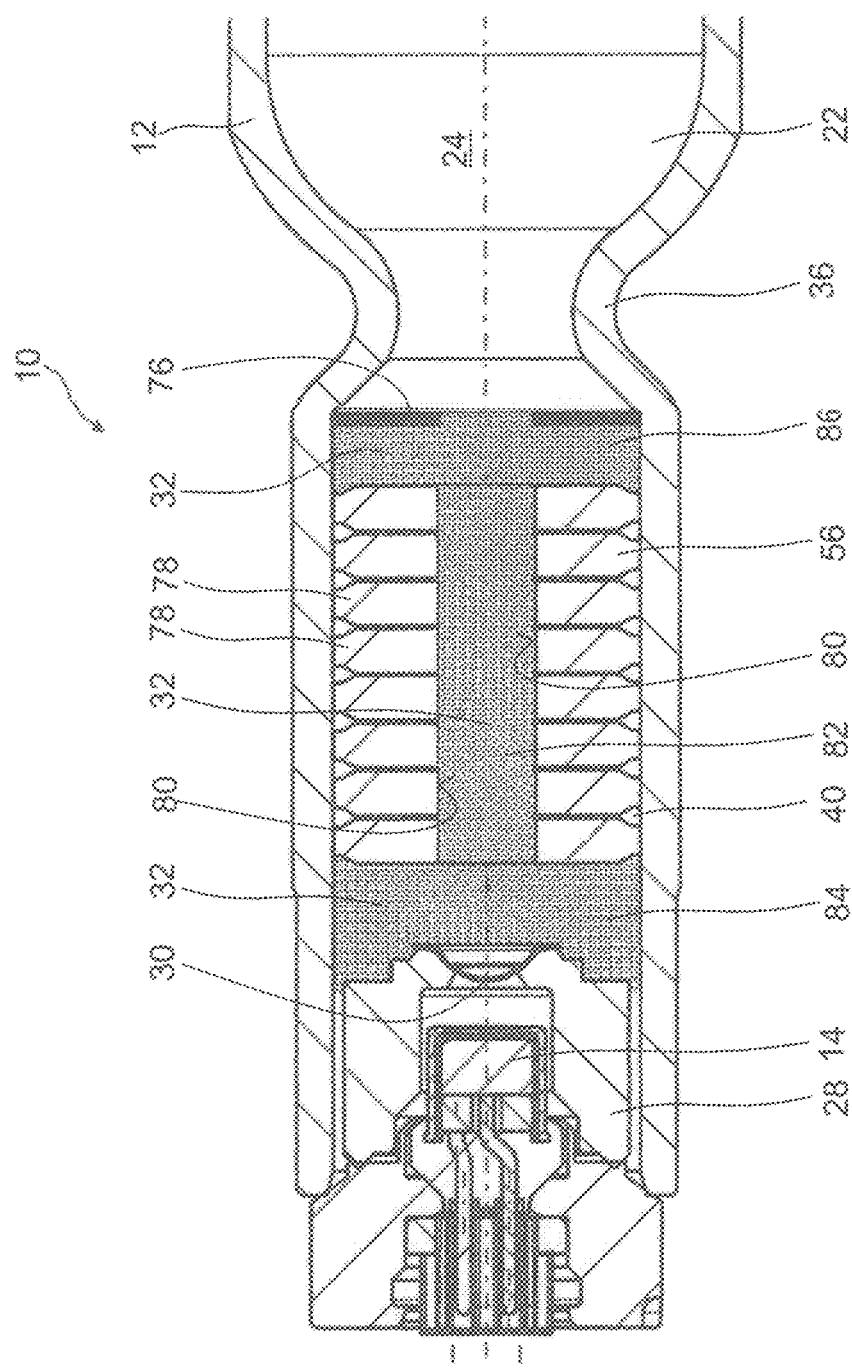
FIG. 17 a variant of the gas generator according to the disclosure of the arrangement shown in FIG. 16.

A variant of the arrangement shown in FIG. 16 is illustrated in FIG. 17. The propellant rings 78 made of the pyrotechnical solid propellant 68 and disposed in the combustion chamber 40 are equally stacked on top of each other and provided with a central bore 80. The gas-permeable fuel body 32 is formed at least in three parts here and includes the cylindrical portion 82 that engages in the central bore 80 of the propellant rings 78. The cylindrical portion 82 thus fixes the propellant rings 78 inside the combustion chamber 40. Furthermore, the gas-permeable fuel body 32 comprises the disk-shaped base member 84 arranged on the igniter side which provides for a volume compensation in the combustion chamber 40. Finally, the gas-permeable fuel body 32 further comprises a lid 86 which is provided on the opposite side of the disk-shaped base member 84 and is placed onto the propellant rings 78. The lid 86 abuts on the filter 76 which, in turn, is held inside the pressure chamber 22 by the annular groove 36 introduced into the housing 12 and partitions the pressure chamber 22 while forming the combustion chamber 40. In the exemplary arrangement shown in FIG. 17, therefore no burst element 38 closing off the combustion chamber 40 is provided. The stack of the propellant rings 78 of the pyrotechnical solid propellant 68 is fixed in the axial direction in the combustion chamber 40 by the filter 76 and the lid 86 of the gas-permeable fuel body 32. Thus, also in this exemplary arrangement, no additional retaining elements are required to fix the pyrotechnical solid propellant 68 and the gas-permeable fuel body 32 inside the combustion chamber 40. As afore-described, the cylindrical portion 82 of the gas-permeable fuel body 32 and either the base member 84 and/or the lid 86 may as well be formed integrally with each other.

Figure 18:
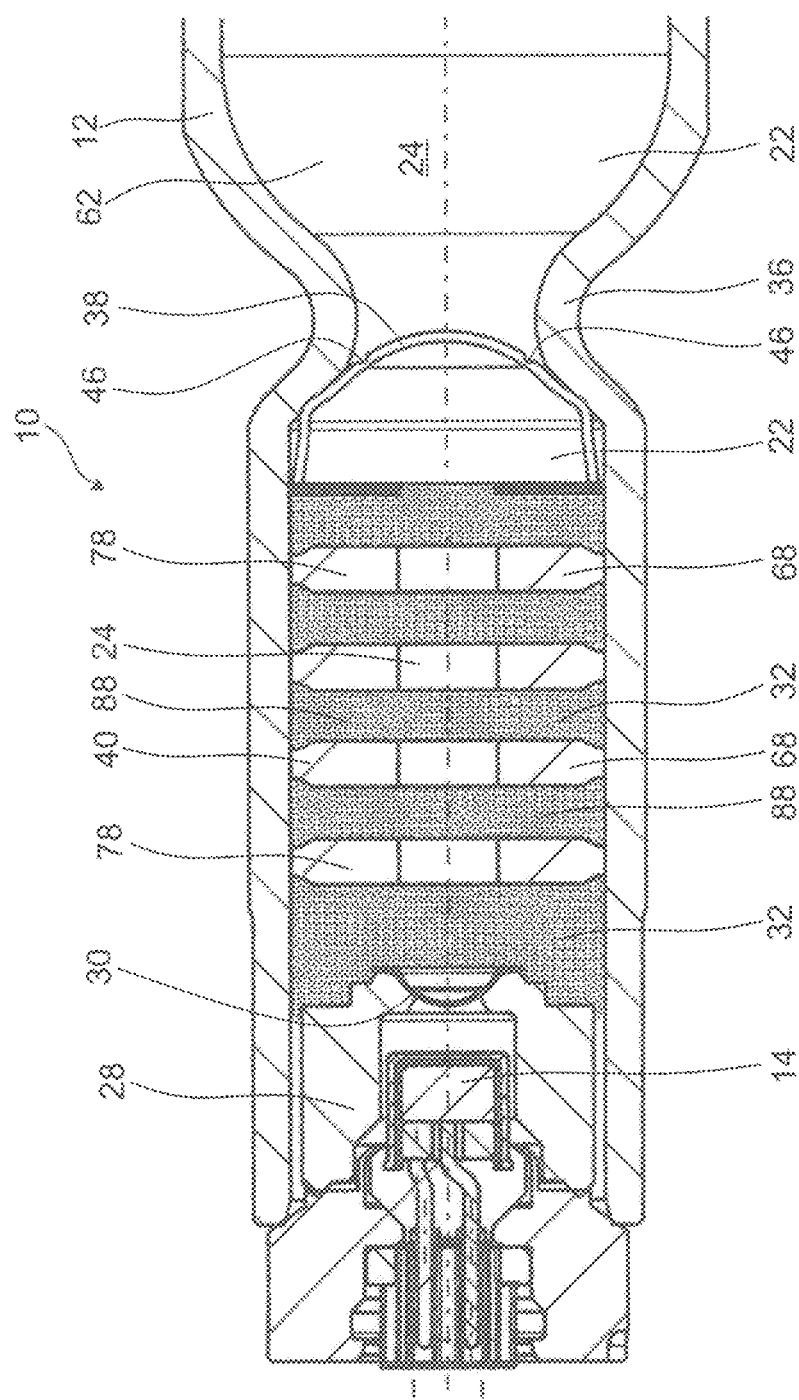
FIG. 18 another variant of the gas generator according to the disclosure of the arrangement shown in FIG. 16.

FIG. 18 illustrates another variant of the gas generator 10 shown in FIG. 16 in which propellant rings 78 or other disk-shaped elements made of the pyrotechnical solid propellant 68, with or without bores, and disk bodies 88 formed of the fuel body 32 are stacked alternately on top of each other. In this case, too, the disk bodies 88 made of the fuel body 32 may have different thickness and may serve as a volume compensation means and/or for adapting the gas generator output. Further, the disk bodies 88 formed of the fuel body 32 may have one or more through-holes. As afore-described, the burst element 38 shown in FIG. 18 may be dropped, or a screen 48 may be provided in addition to the burst element 38 and/or the filter 76.

Figure 19:
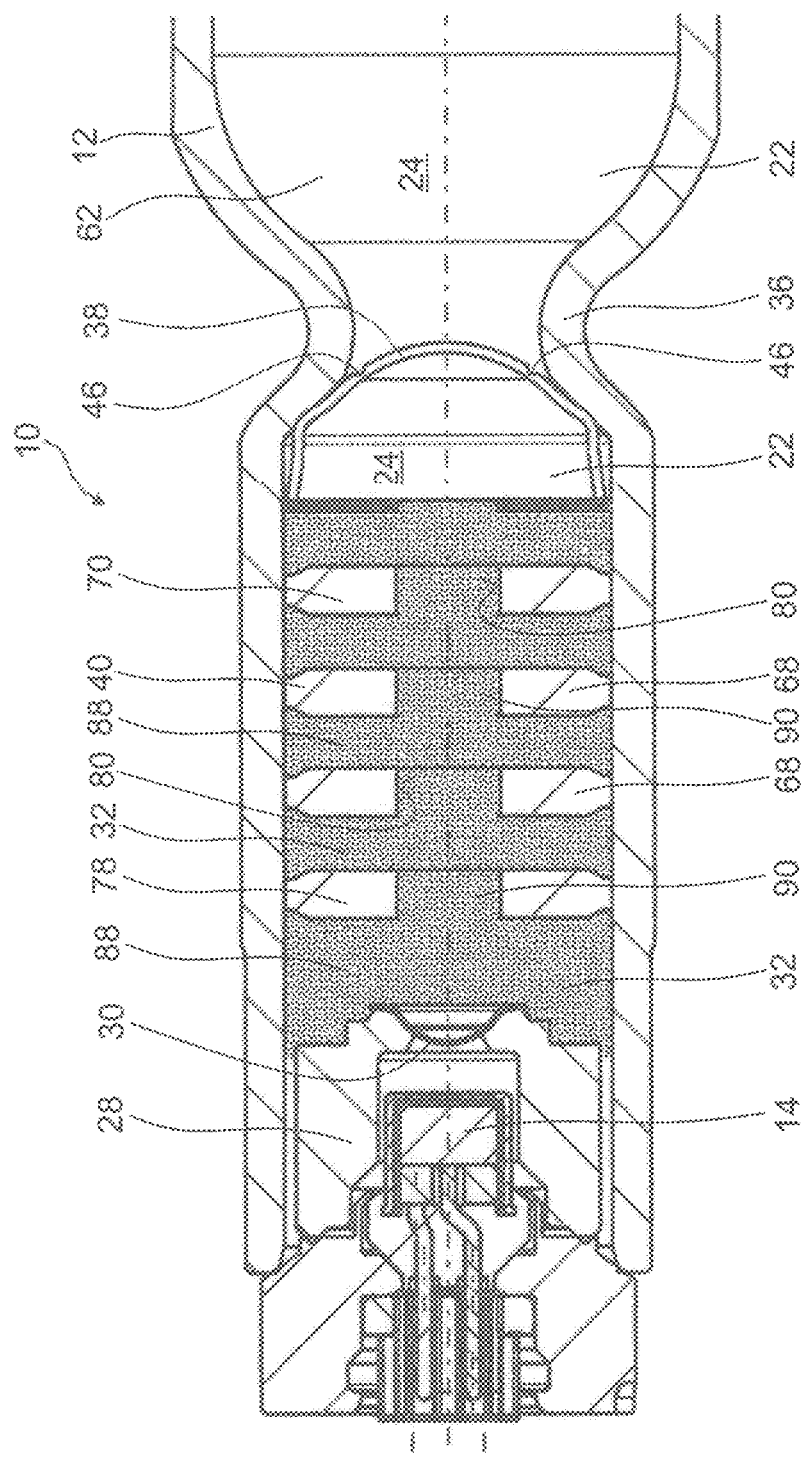
FIG. 19 another variant of the gas generator according to the disclosure of the arrangement shown in FIG. 16.

According to another variant shown in FIG. 19, the disk bodies 88 formed of the fuel body 32 may be provided with an axial projection 90 that engages in the bore 80 provided in the propellant rings 78 made of the pyrotechnical solid propellant 68. Further modifications of this exemplary arrangement are possible. For example, the pyrotechnical solid propellant 68 may be provided in the form of disks having plural through-holes, and the gas-permeable fuel body 32 may have a corresponding shape including one or more projections each of which engages in a through-hole. In this way, an especially stable fixation of the pyrotechnical solid propellant 68 in the combustion chamber 40 is possible.

Otherwise, the remaining structure of the gas generator 10 of the FIGS. 16 and 19 corresponds to the gas generators 10 shown in the above FIGS. 1 to 15. For the components of the gas generator 10 known from FIGS. 1 to 15 the same reference numerals are used, and insofar the foregoing explanations are referred to.

Figures 20, 20A:
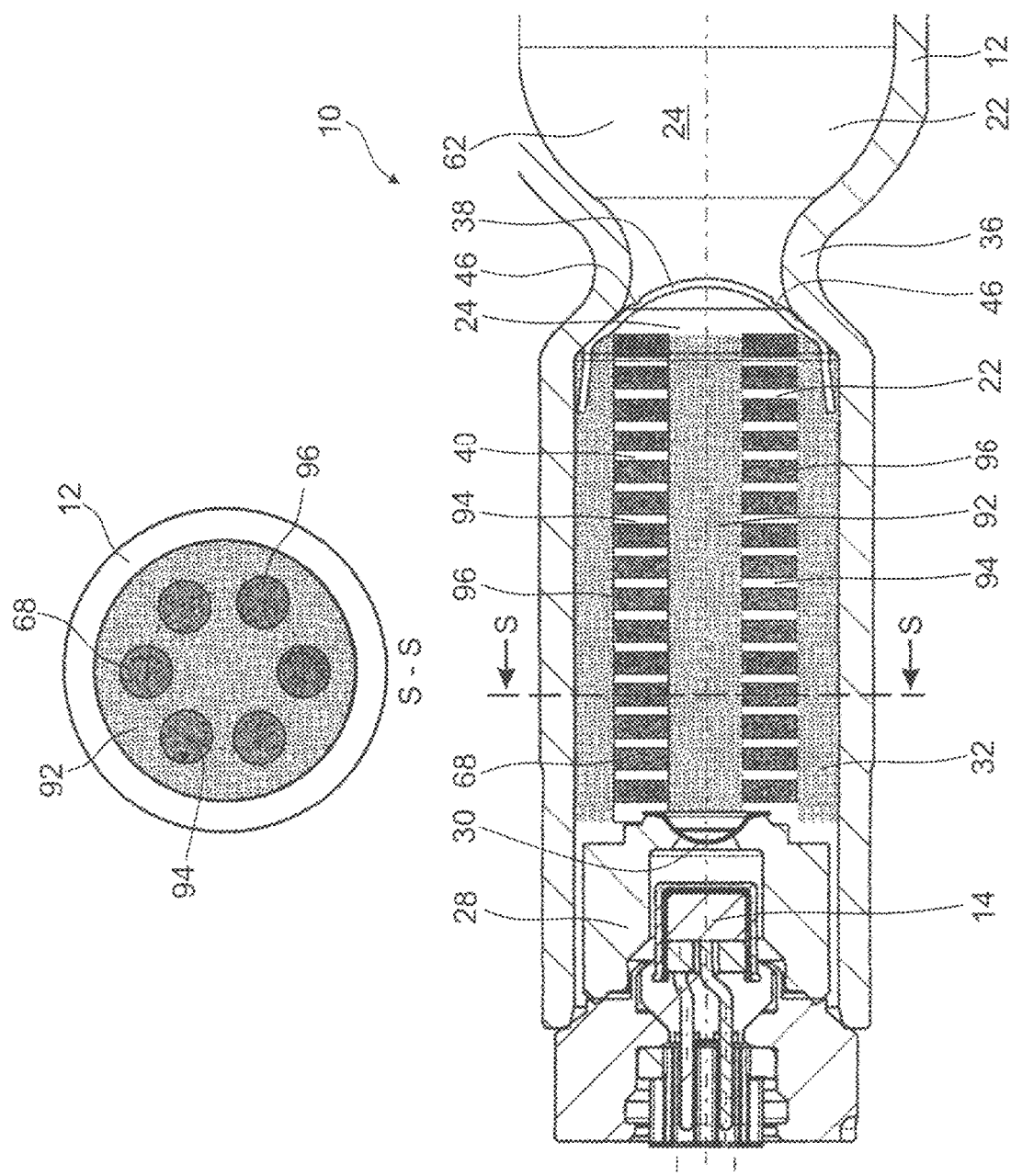
FIGS. 20 and 20*a* another exemplary arrangement of a gas generator according to the disclosure comprising a pyrotechnical solid propellant provided along with a gas-permeable fuel body in a combustion chamber.

The exemplary arrangement of FIGS. 20 and 20a shows a gas generator 10 according to the disclosure in which the pressure chamber 22 is separated from the combustion chamber by the burst element 38, the burst element 38 being provided with overflow openings (not shown) so that the pressure chamber 22 and the combustion chamber 40 are in fluid communication with each other. The gas-permeable fuel body 32 disposed in the combustion chamber 40 is present as a monolithic block in the form of a cylindrical body 92 provided with axially continuous bores 94. The pyrotechnical solid propellant 68 is received in the axial bores 94 in the gas-permeable fuel body 32. In the embodiment shown here, the pyrotechnical solid propellant 68 is in the form of propellant pellets 96 the diameter of which corresponds to the diameter of the axial bores 94 in the gas-permeable fuel body 32 or is slightly, up to 10%, larger. It may also be intended to fill the axial bores 94 with granules or other forms of the pyrotechnical solid propellant 68. In this case, additional covers are provided at the cylindrical body 92 (not shown). Instead of the burst element 38, a screen 48 or a filter 76 (not shown) may be provided which holds the gas-permeable fuel body 32 filled with pyrotechnical solid propellant 68 inside the combustion chamber 40. Further, the cylindrical body 92 made of the fuel 31 may be closed at one end or both ends by a lid made of the fuel 31 which, in turn, can provide a volume compensation in the combustion chamber 40.

Figure 21:
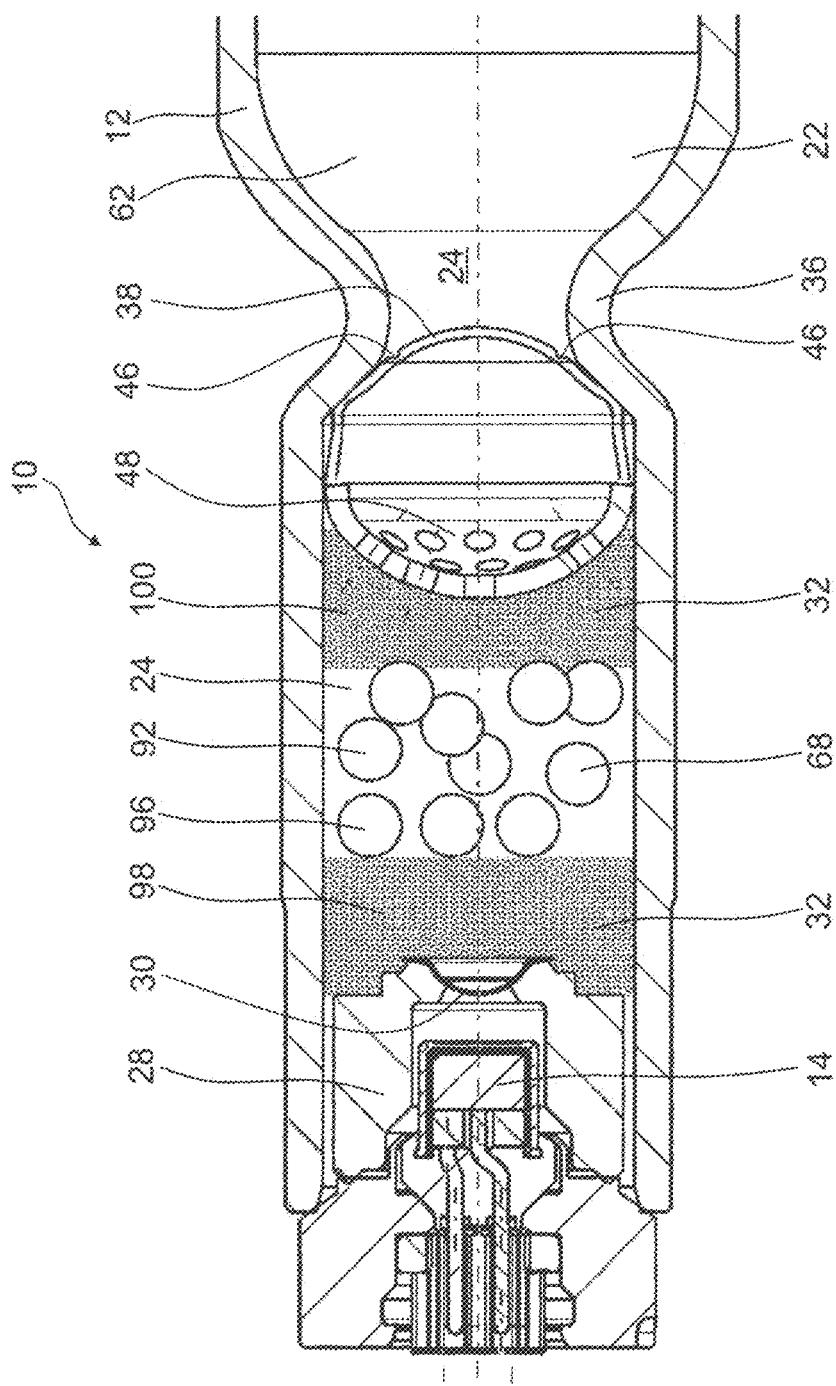
FIG. 21 a further exemplary arrangement of a gas generator according to the disclosure with a pyrotechnic solid propellant present in a combustion chamber together with a gas-permeable fuel body.

In the arrangement of the gas generator according to the disclosure shown in FIG. 21, the pyrotechnical solid propellant 68 is provided in the form of a bed of propellant pellets 96 in the combustion chamber 40. Instead of propellant pellets 96, the bed may also be composed of powder, granules or other molded bodies. The combustion chamber 40 is partitioned from the pressure chamber 22 by the burst element 38. The burst element 38 is configured so that, even before activation of the gas generator 10, a pressure compensation takes place between the pressure chamber 22 and the combustion chamber 40. Ahead of the burst element 38, a screen 48 is provided which can retain the particles forming in the combustion chamber 40 during combustion of the pyrotechnical solid propellant 68 or during opening of the igniter membrane 30. The gas-permeable fuel body 32 comprises two layers 98, 100 by which the propellant bed of the pyrotechnical solid propellant 68 is covered. The layers 98, 100 formed of the fuel 31 are disposed in the axial direction on opposite sides of the propellant bed and, thus, serve as a volume compensation element in the combustion chamber 40 and for preventing rattling noise.

Otherwise, the remaining structure of the gas generator 10 of the FIGS. 20 and 21 corresponds to the gas generators 10 shown in the above FIGS. 1 to 19. For the components of the gas generator 10 known from FIGS. 1 to 19 the same reference numerals are used, and insofar the foregoing explanations are referred to.

Figure 22:
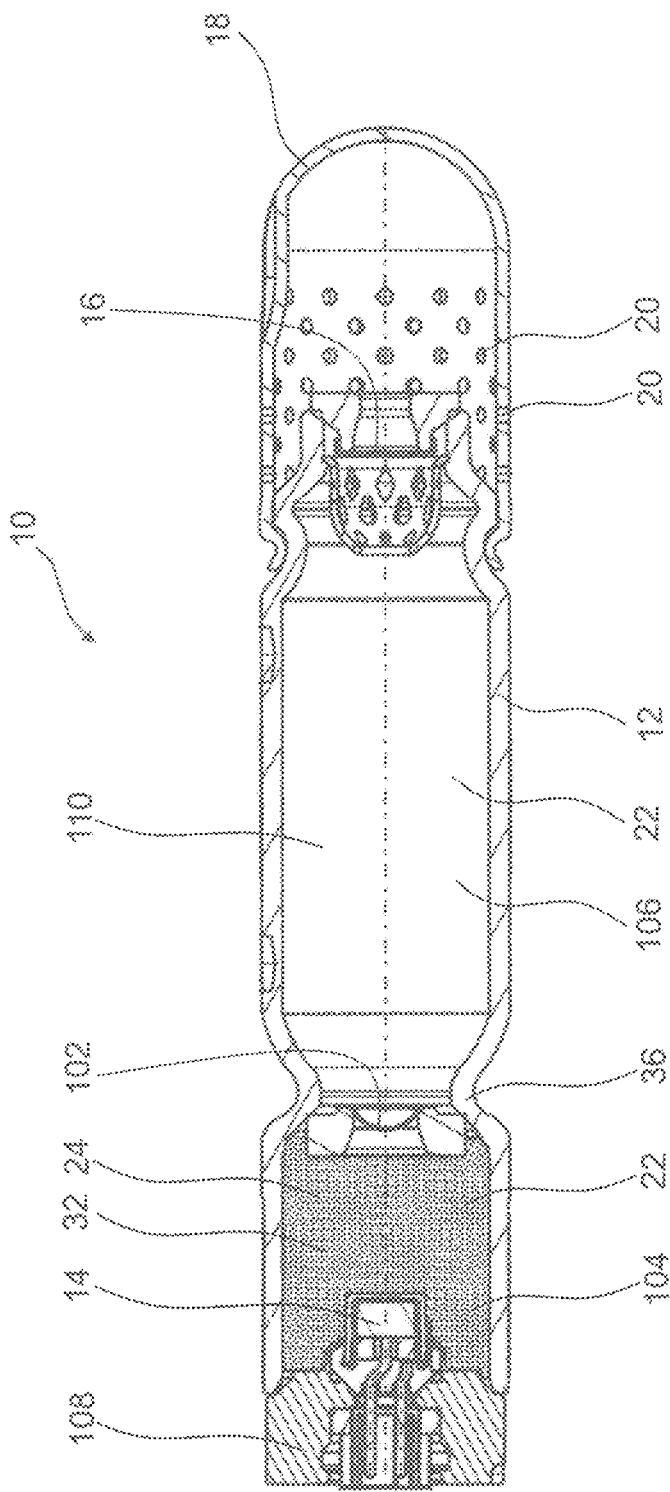
FIG. 22 an exemplary arrangement of a gas generator according to the disclosure comprising two pressure chamber portions separated pressure-tightly from each other.

The exemplary arrangement shown in FIG. 22 illustrates a gas generator 10 in which the pressure chamber 22 is subdivided into two pressure chamber portions 104 and 106 pressure-tightly separated from each other. The pressure chamber portions 104 and 106 thus can also be considered to be first and second pressure chambers.

The tubular housing 12 encloses both pressure chamber portions 104 and 106 and, at its first axial end, has an igniter 14 and, at its second axial end, has a membrane 16 closing the gas generator off from the outside environment. A diffusor 18 provided with outflow openings 20 is connected in the axial direction to the housing 12 and transmits gas flowing out of the pressure chamber 22 to the safety device to be activated (not shown). The diffusor 18 is provided at the axial end of the housing 12 where also the membrane 16 is located.

The first pressure chamber portion 104 disposed on the igniter side in the housing 12 extends in the axial direction from a base plate 108 provided with a holder for the igniter 14 to the annular groove 36 radially peripheral in the housing 12 at which annular groove 36 the further membrane 102 is fixed. The further membrane 102 seals the first pressure chamber portion 104 in a gas-tight and pressure-tight manner from the second pressure chamber portion 106 adjacent in the axial direction. The igniter 14 is received equally pressure-tightly in the base plate 108.

The first pressure chamber portion 104 contains, as a single fuel 31, a gas-permeable fuel body 32 as well as a compressed gas 24 with a gaseous oxidant for conversion of the fuel 31 while forming thermal energy, wherein the molar fraction of the gaseous oxidant in the compressed gas is at least 1.1 times the amount of oxidant required for a stoichiometric conversion of the fuel 31. In addition, the compressed gas 24 in the first pressure chamber portion 104 may also contain an inert gas such as helium, argon or nitrogen.

The compressed gas 110 in the second pressure chamber portion 106 is preferably made up of an inert gas or an inert gas mixture without a gaseous oxidant. The second pressure chamber portion 106 contains no gas-permeable fuel body 32 or any other pyrotechnical solid propellant 68, either.

The gas pressure in the two pressure chamber portions 104 and 106 adjacent to each other is in a range of from 350 to 700 bars and is equal so that the further membrane 102 between the pressure chamber portions 104, 106 need not have any resistance to pressure, as in the idle state of the gas generator 10 it is effectively not pressure-loaded.

Upon activation of the igniter 14, the gas-permeable fuel body 32 in the first pressure chamber portion 104 is heated by the hot gases and/or particles released by the igniter 14 so that a conversion takes place with the gaseous oxidant equally present in the first pressure chamber portion 104. The thermal energy formed during said conversion results in excess pressure in the first pressure chamber portion 104 so that the membrane 102 between the first and second pressure chamber portions 104, 106 as well as, adjacent thereto, also the membrane 16 at the opposite end of the second pressure chamber portion 106 are opened. The compressed gas 24 and 110 then may exit the pressure chamber 22 and may be guided via the outflow openings 20 to the safety device to be activated.

Otherwise, the remaining structure of the gas generator 10 of FIG. 22 corresponds to the gas generators 10 shown in the above FIGS. 1 to 21. For the components of the gas generator 10 known from FIGS. 1 to 21 the same reference numerals are used, and insofar the foregoing explanations are referred to.

Figure 23C:
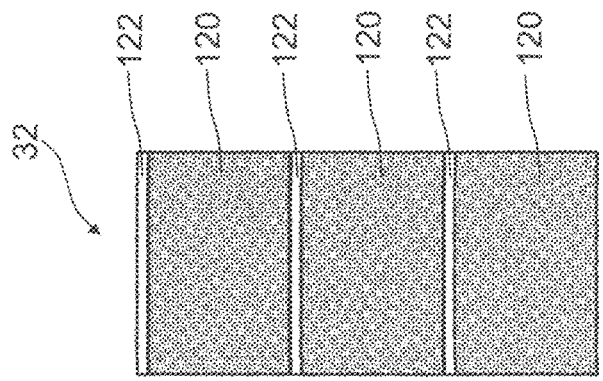
FIG. 23*a* to FIG. 23*c* various exemplary arrangements of a gas-permeable fuel body.
Figure 23B:
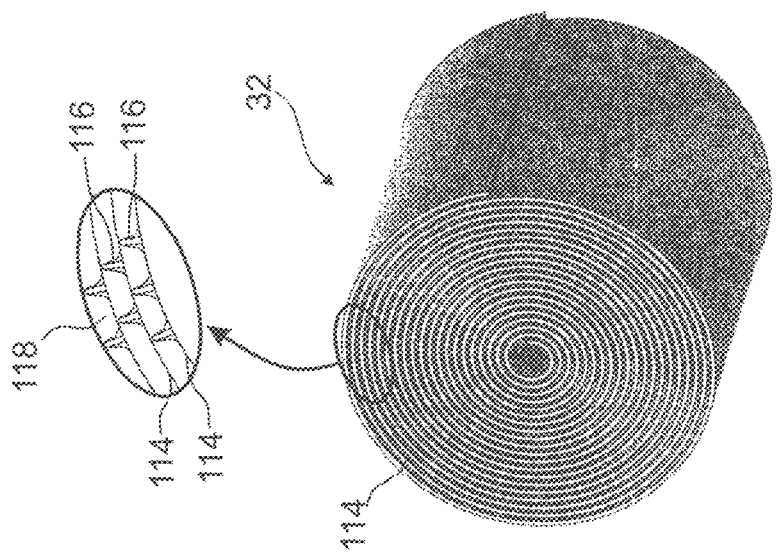
Figure 23A:
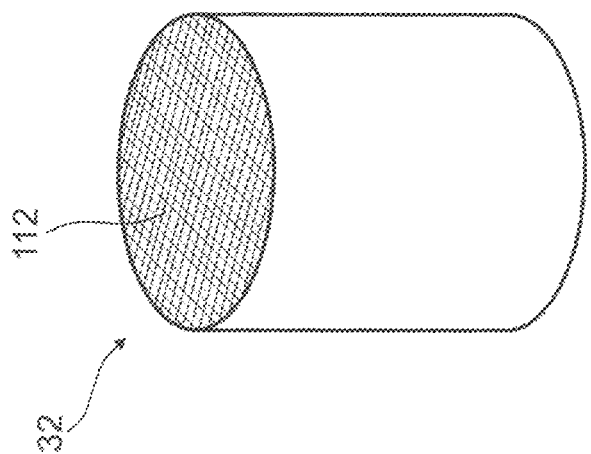

Further configurations of the gas-permeable fuel body 32 are shown in FIGS. 23a to 23c. FIG. 23a illustrates a gas-permeable fuel body 32 having a honeycomb structure with continuous cavities 112 which extend substantially in parallel to each other. The cavities 112 form passages into which the gaseous oxidant can enter.

FIG. 23b illustrates a gas-permeable fuel body 32 in the form of a roll, wherein the rolled-up textile layers 114 are separated from each other by spacers 116 so that continuous cavities 118 are formed in the roll. The textile layers 114 themselves may have a thickness of from 5 to 200 μm. The height of the spacers 116 preferably is 3 to 5 times the thickness of the layers 114. The gaseous oxidant contained in the compressed gas 24 may penetrate the cavities 118 formed by the spacers 116 between the layers 114 and thus is in close direct contact with the layers 114. The spacers 116 have to be regarded as optional, however. In other words, in such an alternative arrangement (not shown) no spacers 116 are required or present, as the cavities 118 are resulting virtually automatically from a corresponding geometric structure of the textile layers 114 in the form of a fabric, a knitted fabric, a knit, a non-woven or a laid fabric.

FIG. 23c illustrates a gas-permeable fuel body 32 having textile layers 120 stacked on top of each other each of which consists, from a textile intermediate layer 122, of a material burning differently quickly compared to the textile layers 120, which material can be converted with the gaseous oxidant. Since the textile layers 122 burn more quickly or more slowly than the gas-permeable fuel body 32, this arrangement further helps control the combustion rate of the gas-permeable fuel body 32.

The afore-described arrangements of the gas generator according to the disclosure are meant to be examples only and by no means to be limiting. Modifications and variations of the described arrangements according to the disclosure are obvious to those skilled in the art when reading this description, without departing from the extent of the disclosure defined in the attached claims.

The invention claimed is:

1. A gas generator for a safety device in vehicles, comprising
a pressure chamber which is filled with compressed gas and which is closed off from an environment outside of the gas generator, wherein the compressed gas contains a gaseous oxidant which is predominantly composed of oxygen;
a solid fuel received in the pressure chamber, wherein the compressed gas is in direct contact with the fuel before the gas generator is activated; and
an igniter separated pressure-tightly from the pressure chamber by which, when the gas generator is activated, a conversion of the gaseous oxidant with the solid fuel can be triggered with heat being generated;
wherein the fuel is provided in the form of a gas-permeable fuel body made up of one or more fibers wherein a starting material thickness of said one or more fibers are 0.01 to 1 mm, and a molar fraction of the gaseous oxidant in the compressed gas is at least 1.1 times an amount of oxidant required for a stoichiometric conversion of the gas-permeable fuel body.

2. The gas generator according to claim 1, wherein the gaseous oxidant comprises the oxygen and further gaseous oxidants, and has a molar percentage of at least 60% of the oxygen.

3. The gas generator according to claim 1, wherein the gas-permeable fuel body is made from a textile material in which the one or more fibers are contained.

4. The gas generator according to claim 3, wherein the textile is one of a fabric, knitted fabric, a knit, a non-woven, a felt, a laid fabric and a wadding.

5. The gas generator according to claim 1, wherein the one or more fibers are natural fibers.

6. The gas generator according claim 1, wherein the one or more fibers are synthetic fibers.

7. The gas generator according to claim 1, wherein the one or more fibers are either spun into threads, are twisted into yarns and/or twists.

8. The gas generator according to claim 7, wherein the fibers are further processed into a three-dimensional fiber body.

9. The gas generator according to claim 1, wherein the fibers that make up the gas-permeable fuel body are in the form of one of a cylindrical body, a lap or a coil.

10. The gas generator according to claim 1, wherein the fiber is in the form of one or more threads, and the gas-permeable fuel body comprises a carrier onto which the thread or threads is/are wound.

11. The gas generator according to claim 1, wherein the gas-permeable fuel body fills at least 3% of the volume of the pressure chamber.

12. The gas generator according to claim 1, wherein the pressure chamber contains, in addition to the gas-permeable fuel body, a pyrotechnical solid propellant received in the pressure chamber.

13. The gas generator according to claim 12, wherein the fibers that make up the gas-permeable fuel body are arranged in a form of a hollow cylinder into which the pyrotechnical solid propellant is introduced.

14. The gas generator according to claim 1, wherein the gas-permeable fuel body is present spaced apart from the igniter inside the pressure chamber, wherein the fuel body is arranged at a distance of up to two times the inner diameter of the housing.

15. The gas generator according to claim 1, wherein a component is provided which partitions the pressure chamber while forming a combustion chamber adjacent to the igniter, wherein the gas-permeable fuel body.

16. The gas generator according to claim 15, wherein the combustion chamber occupies about 2 to 50% of the volume of the pressure chamber.

17. The gas generator according to claim 15, wherein a pyrotechnical solid propellant is received in the combustion chamber.

18. The gas generator according to claim 1, wherein when the gas generator is activated, at least one shockwave occurs which can be propagated at least in portions through the pressure chamber to cause a membrane to be destroyed.

19. A module comprising a gas generator, an airbag inflatable by the gas generator and a mounting device for attaching the module to a vehicle, wherein the gas generator is configured according to claim 1.

20. A vehicle safety system for the protection of a person, comprising a gas generator, an airbag inflatable by said gas generator as part of a module, and an electronic control unit by which the gas generator can be activated when a trigger situation is present, wherein the gas generator is configured according to claim 1.

* * * * *